US012131668B2

(12) United States Patent
Simmons et al.

(10) Patent No.: US 12,131,668 B2
(45) Date of Patent: Oct. 29, 2024

(54) AUTOGRAPH BALL—SIGNATURE CARD HOLDER

(71) Applicants: Kevin Lynn Simmons, Carrollton, TX (US); Michael D Herndon, Dallas, TX (US)

(72) Inventors: Kevin Lynn Simmons, Carrollton, TX (US); Michael D Herndon, Dallas, TX (US)

( * ) Notice: Subject to any disclaimer, the term of this patent is extended or adjusted under 35 U.S.C. 154(b) by 700 days.

(21) Appl. No.: 17/168,682

(22) Filed: Feb. 5, 2021

(65) Prior Publication Data

US 2021/0272483 A1 Sep. 2, 2021

Related U.S. Application Data

(60) Provisional application No. 62/982,746, filed on Feb. 27, 2020.

(51) Int. Cl.
*G09F 1/12* (2006.01)
*G09F 15/00* (2006.01)

(52) U.S. Cl.
CPC ............ *G09F 1/12* (2013.01); *G09F 15/0012* (2013.01); *G09F 15/0018* (2013.01)

(58) Field of Classification Search
CPC ........ B43K 23/00; B43M 99/001; G09F 1/12; G09F 15/0012; G09F 15/0018; G09F 23/0066
USPC ......... 40/334, 312, 327, 329, 358, 720, 800, 40/765; 248/473, 441.1, 444, 346.01, 248/682, 686; D19/77–82; D6/306, 300; D3/303–314
See application file for complete search history.

(56) References Cited

U.S. PATENT DOCUMENTS

| | | | | |
|---|---|---|---|---|
| 1,857,423 | A | | 5/1932 | Zadek |
| 2,125,208 | A | | 7/1938 | Thomas |
| 2,486,840 | A | | 11/1949 | Harris |
| 3,624,939 | A | | 12/1971 | Gossard |
| 4,060,173 | A | | 11/1977 | Dahl |
| D259,084 | S | * | 5/1981 | Stahel, II ........................ D6/309 |
| 4,291,809 | A | | 9/1981 | Lyon |
| 4,322,001 | A | | 3/1982 | Hurley |
| 4,355,726 | A | | 10/1982 | Mutschler |
| 4,385,688 | A | | 5/1983 | Grant |
| 4,533,058 | A | | 8/1985 | Uhlig |
| 4,798,310 | A | | 1/1989 | Kasai et al. |
| 4,807,377 | A | | 2/1989 | Stuckel |
| 4,829,691 | A | | 5/1989 | Manjos et al. |
| 4,907,824 | A | | 3/1990 | Smirnoff |
| 4,944,968 | A | | 7/1990 | Wagner |
| 4,979,619 | A | | 12/1990 | Hager |
| 5,010,673 | A | | 4/1991 | Connor et al. |
| 5,040,671 | A | | 8/1991 | Hager |
| 5,046,616 | A | | 9/1991 | Makowski et al. |
| 5,097,953 | A | | 3/1992 | Gingras |
| 5,119,574 | A | | 6/1992 | King |
| 5,121,563 | A | | 6/1992 | Connor et al. |

(Continued)

*Primary Examiner* — Cassandra Davis

(57) ABSTRACT

A holder shaped as at least a portion of a sports object including a bottom surface arranged to keep the holder in a stationary position while resting on a level surface. The holder is also shaped with a facing that includes a flat signing surface recessed into the facing. The flat signing surface is arranged to allow a trading card to be inserted in an opening. The holder includes a stepped cylindrical shaft arranged to retain a removable object.

19 Claims, 21 Drawing Sheets

(56) References Cited

U.S. PATENT DOCUMENTS

| | | | | | |
|---|---|---|---|---|---|
| 5,133,450 | A | | 7/1992 | Rademacher | |
| 5,137,453 | A | | 8/1992 | Hudson | |
| 5,154,292 | A | | 10/1992 | Bartucca et al. | |
| 5,207,174 | A | * | 5/1993 | Fabbrini | B43K 29/00 401/52 |
| 5,224,600 | A | | 7/1993 | Neugebauer | |
| D339,239 | S | * | 9/1993 | Perkins | D7/901 |
| D340,076 | S | * | 10/1993 | Turner | D3/271.9 |
| 5,356,136 | A | | 10/1994 | Ippolito | |
| 5,365,683 | A | | 11/1994 | Borja | |
| 5,415,290 | A | | 5/1995 | Merkley et al. | |
| 5,419,062 | A | | 5/1995 | Polinski et al. | |
| 5,462,167 | A | | 10/1995 | Polinski et al. | |
| D368,036 | S | * | 3/1996 | Tronolone, Jr. | D10/2 |
| 5,537,369 | A | * | 7/1996 | Wu | G09D 3/00 40/120 |
| 5,619,814 | A | * | 4/1997 | Herrndobler | A47G 1/14 40/358 |
| D388,464 | S | * | 12/1997 | Najbart | D19/78 |
| D437,353 | S | * | 2/2001 | Richter | D19/78 |
| 6,186,461 | B1 | * | 2/2001 | Pelaez | B43K 23/002 206/214 |
| 6,212,811 | B1 | * | 4/2001 | Jones | A47G 1/14 40/781 |
| 6,736,429 | B1 | | 5/2004 | Steeg | |
| 6,834,451 | B1 | | 12/2004 | Prost | |
| 6,973,747 | B2 | * | 12/2005 | Ratmansky | G09F 3/18 473/588 |
| 7,367,145 | B2 | | 5/2008 | Mou | |
| 9,183,769 | B2 | | 11/2015 | Newcomb | |
| 9,375,973 | B2 | | 6/2016 | Huffman | |
| 9,731,544 | B2 | * | 8/2017 | Huffman | B43K 23/001 |
| 10,010,767 | B1 | | 7/2018 | Stach | |
| 2021/0022467 | A1 | * | 1/2021 | Cox | A45C 13/1069 |

* cited by examiner

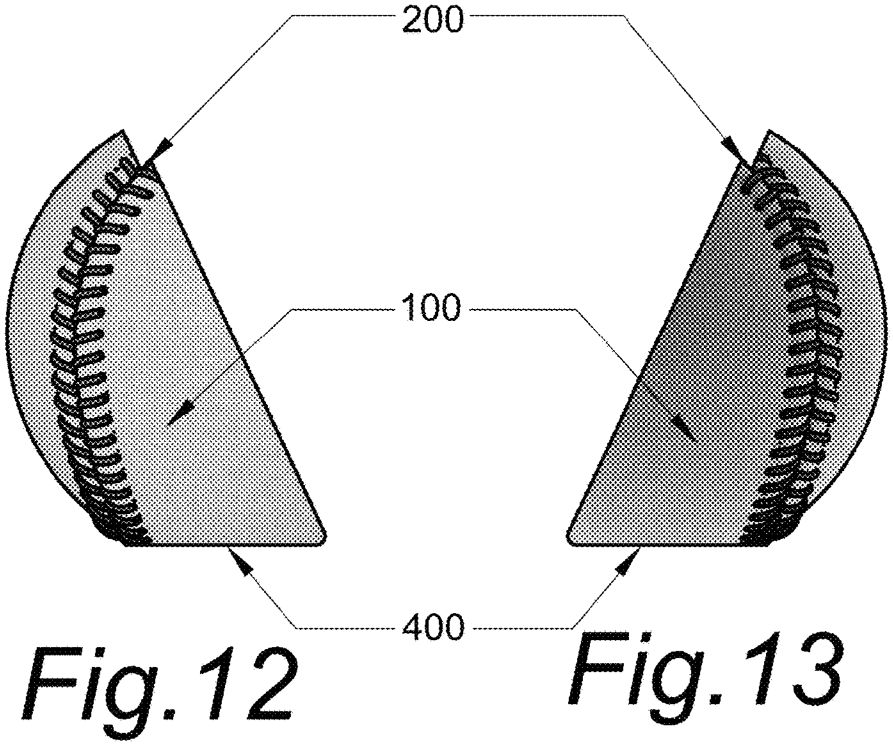
Fig.12
Fig.13
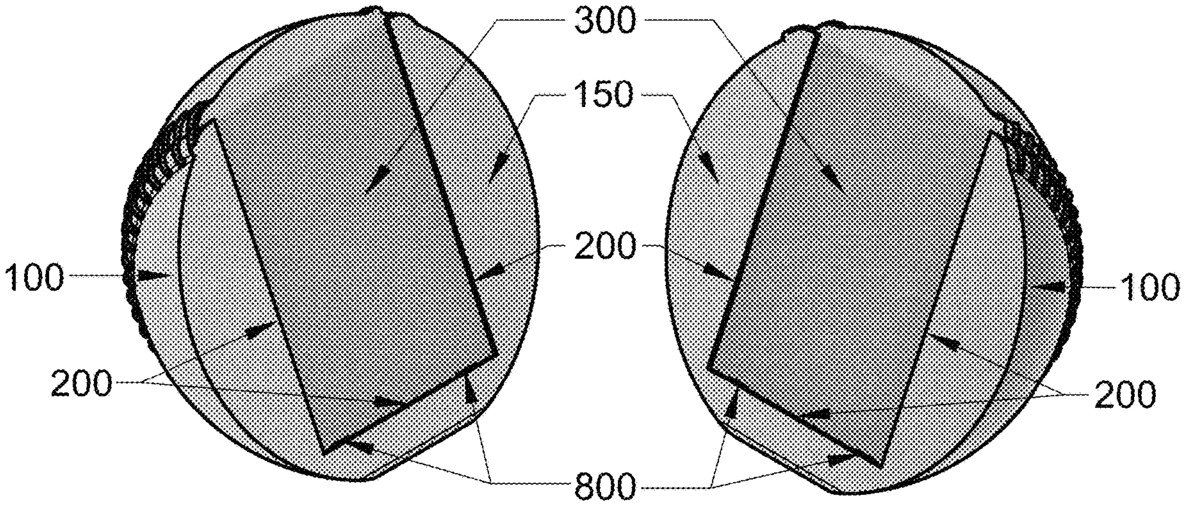
Fig.10
Fig.11

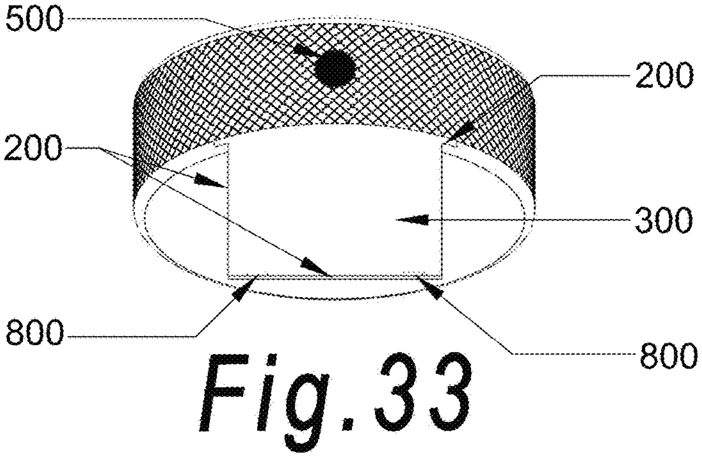
Fig. 33
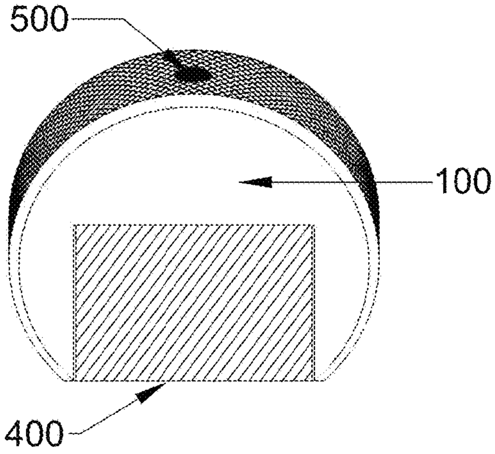
Fig. 31
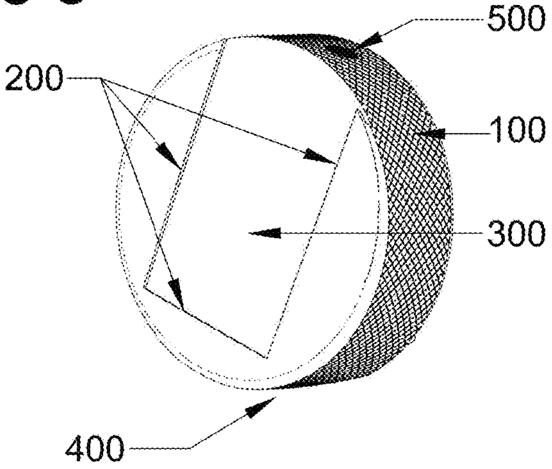
Fig. 32
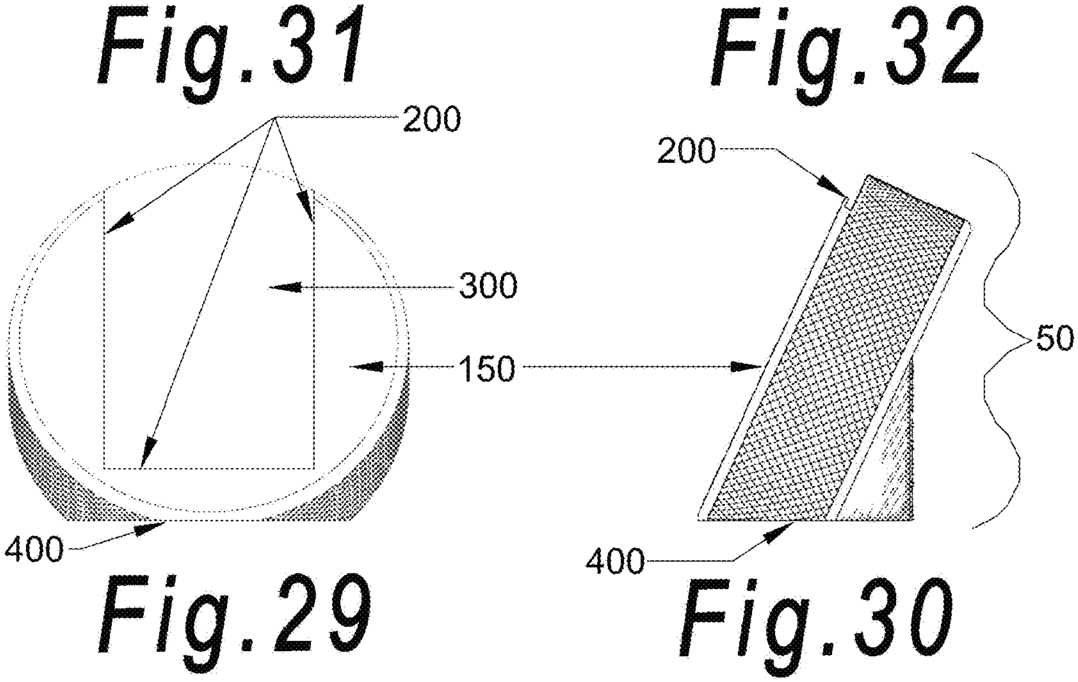
Fig. 29
Fig. 30

AUTOGRAPH BALL—SIGNATURE CARD HOLDER

This application claims priority to provisional patent application 62/982,746, filed Feb. 27, 2020.

BACKGROUND OF INVENTION

The collection of trading cards is a time honored tradition that often starts in childhood, and for some, continues into their adult years. Trading cards often become more valuable and more collectible if signed by the player they describe. Unfortunately, affixing a signature on a card may be a cumbersome experience.

Players are often approached by signature collectors around a sporting event in which the player will be performing. The player has limited time, and the availability of a flat surface with which to sign a trading card is often unavailable. Consequently, the player may not want to sign a trading card or the signature is of poor quality.

Additionally, a signature collector may have forgotten or lost their writing instrument to offer to the player so that the trading card may be autographed. Also, readily available holders for a trading card, such as a clipboard, may imprint a mark on the trading card from the spring loaded retainer. Any unintended alteration to a trading card and/or wear, may drastically reduce the value of a signed trading card.

Often times a celebrity athlete signature is very difficult to identify and/or decipher. Ideally, the celebrity athlete would sign their trading card as opposed to a sports object, such as a baseball, golf ball, tennis ball, football, etc. A signed trading card offers an advantage to efficiently identify a signature of a celebrity athlete.

Celebrity athletes are often observed maintaining a safe distance of approximately six feet from fans settled in the front row of a field. In these cases, athletes will only sign items that can be safely and gently tossed a short distance, for example a baseball; therefore, a fan without a baseball and writing utensil misses out on the opportunity to collect an autograph. Tossing a flat item such as a trading card a distance of six feet is logistically impossible.

The claimed invention solves many of the above issues with obtaining a quality signature on a trading card.

The Applicants have reviewed multiple prior art patents. None of these prior art patent, alone or in combination, reasonably show or suggest the claimed invention. A summary of selected prior art patents that were reviewed is provided below.

U.S. Pat. No. 3,624,939 to Gossard, issued Dec. 7, 1971, discloses a pair of housing parts that are hinged together to define an enclosure for a plurality of photographs. A retainer on one of the housing parts receives peripheral apertures in the photographs to maintain them in planes parallel to the axis of the hinge.

U.S. Pat. No. 5,419,062 to Polinski et al., issued May 30, 1995, discloses a sports card frame in the shape of an article used in a particular sport. The frame has a front or outer generally planar surface and pockets in the planar surface having structure for holding a plurality of sports cards in a predetermined array. The number of sports cards receiving pockets being equal to the number of players on a team in a particular sport.

U.S. Pat. No. 6,736,429 B1 to Steeg, issued May 18, 2004, discloses a sports object, such as a baseball, hockey puck, golf club, etc., including a pen attached to the sports object via a cord and contained in a hole drilled into the sports object. The pen may be removed from the hole in the sports object to obtain a signature on the sports object itself.

U.S. Pat. No. 6,834,451 B1 to Prost, issued Dec. 28, 2004, discloses a ball, subdivided into one eight sections of the sphere that are magnetically coupled, so that colorful stickers may be adhered to inner surfaces of the sections for advertisement purposes.

U.S. Pat. No. 9,183,769 B2 to Newcomb, issued Nov. 10, 2015, discloses an autograph ball with electronic circuitry enclosed. The ball may be autographed on an external surface, and the electronic circuitry may record and playback an audio message.

U.S. Pat. No. 9,375,973 B2 to Huffman, issued Jun. 28, 2016, discloses an autograph ball including a writing utensil contained in a hole drilled into the autograph ball. The hole for the writing utensil has a spring and cap mechanism to retain the writing utensil inside the autograph ball. The autograph ball may be autographed on an external surface.

U.S. Pat. No. 9,731,544 B2 to Huffman, issued Aug. 15, 2017, discloses an autograph ball including a writing utensil contained in a hole drilled into the autograph ball. The hole for the writing utensil has a spring, and the writing utensil is specifically designed to reside and be retained inside the autograph ball when needed. The autograph ball may be autographed on an external surface.

U.S. Pat. No. 10,010,767 B1 to Stach, issued Jul. 3, 2018, discloses a housing to retain a baseball and a writing instrument. The writing instrument is attached to the housing via a cord. The housing provides a comfortable support surface to better enable signing the baseball.

U.S. Pat. No. 10,847,060 B1 to Rose, issued Nov. 24, 2020, discloses a trading card display assembly for securely displaying trading cards that includes a plurality of hanger units. Each of the hanger units is removably coupled to a support surface and the hanger units removably engage each other such that the plurality of hanger units forms a single panel on the support surface.

The above, and other prior art patents, are listed on an Information Disclosure Statement, filed concurrently with this patent application.

BRIEF DESCRIPTION OF DRAWINGS

FIG. 10 illustrates a left front isometric representation of a holder—baseball edition.

FIG. 11 illustrates a right front isometric representation of a holder—baseball edition.

FIG. 12 illustrates a left view representation of a holder—baseball edition.

FIG. 13 illustrates a right view representation of a holder—baseball edition.

FIG. 29 illustrates a front view representation of a holder—hockey edition.

FIG. 30 illustrates a right view representation of a holder—hockey edition.

FIG. 31 illustrates a rear view representation of a holder—hockey edition.

FIG. 32 illustrates a right front isometric representation of a holder—hockey edition.

FIG. 33 illustrates an isometric top view representation of holder—hockey edition.

DETAILED DESCRIPTION OF THE INVENTION

The following detailed description is of the best currently contemplated modes of carrying out exemplary embodiments of the invention. In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. The description is not to be taken in a limiting sense, but made merely for the purpose of illustrating the general principles of the invention, since the scope of the invention is only limited by the appended claims.

Figure 1:
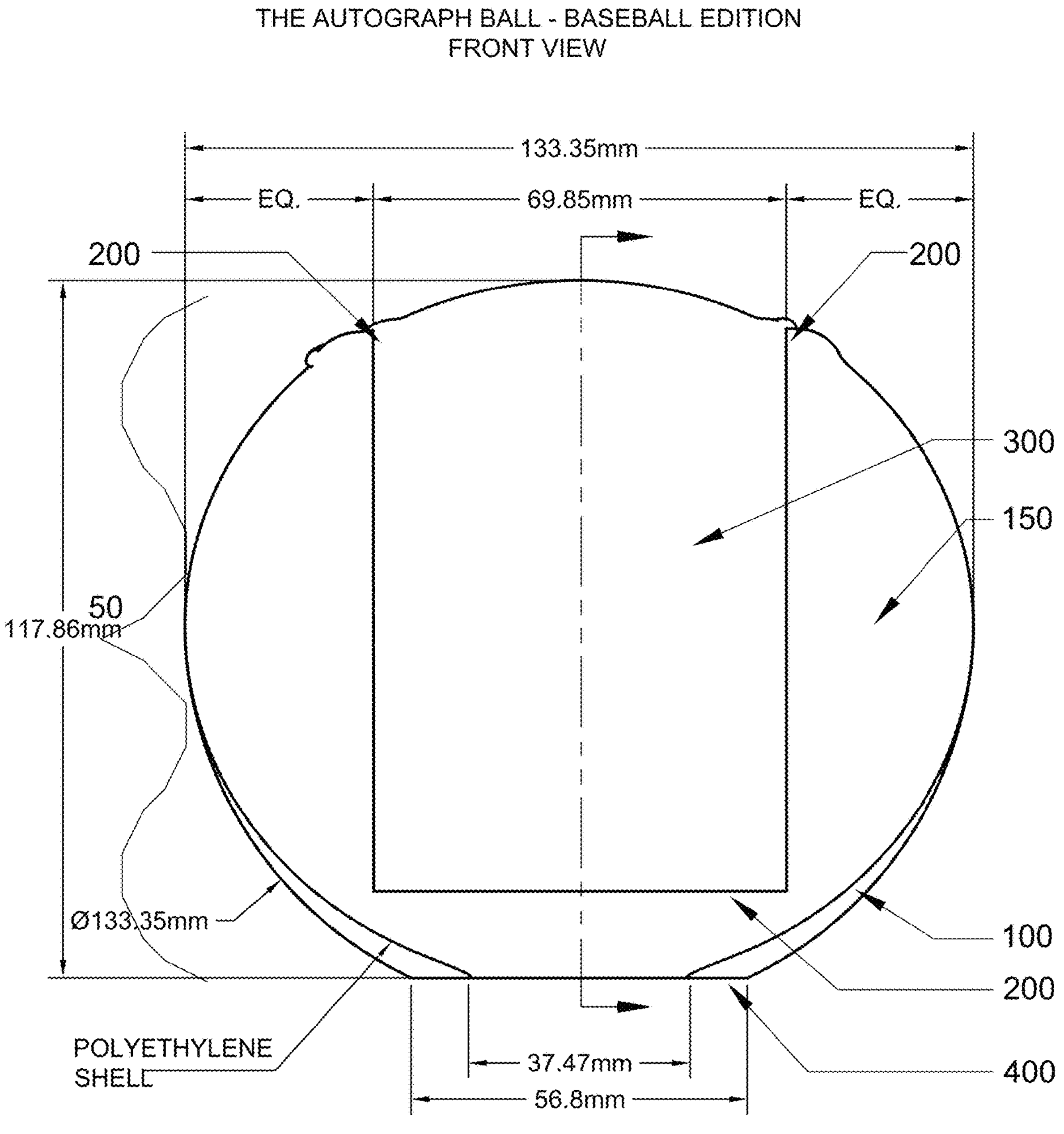
FIG. 1 illustrates a front view representation of a holder—baseball edition.

FIG. 1 is a front view representation of a holder 50 (baseball edition), designed to represent a portion of a baseball. As such, FIGS. 1-4 and 6-16 represent the baseball edition of the holder 50. The front view representation of holder 50, shown in FIG. 1, shows a visible curvature of holding surface 100 and also shows facing 150 that contains a flat signing surface 300. The flat signing surface 300 is recessed relative to the facing 150, with a plane aligned with the flat signing surface 300 being substantially parallel to a plane aligned with the facing 150.

Figure 5:
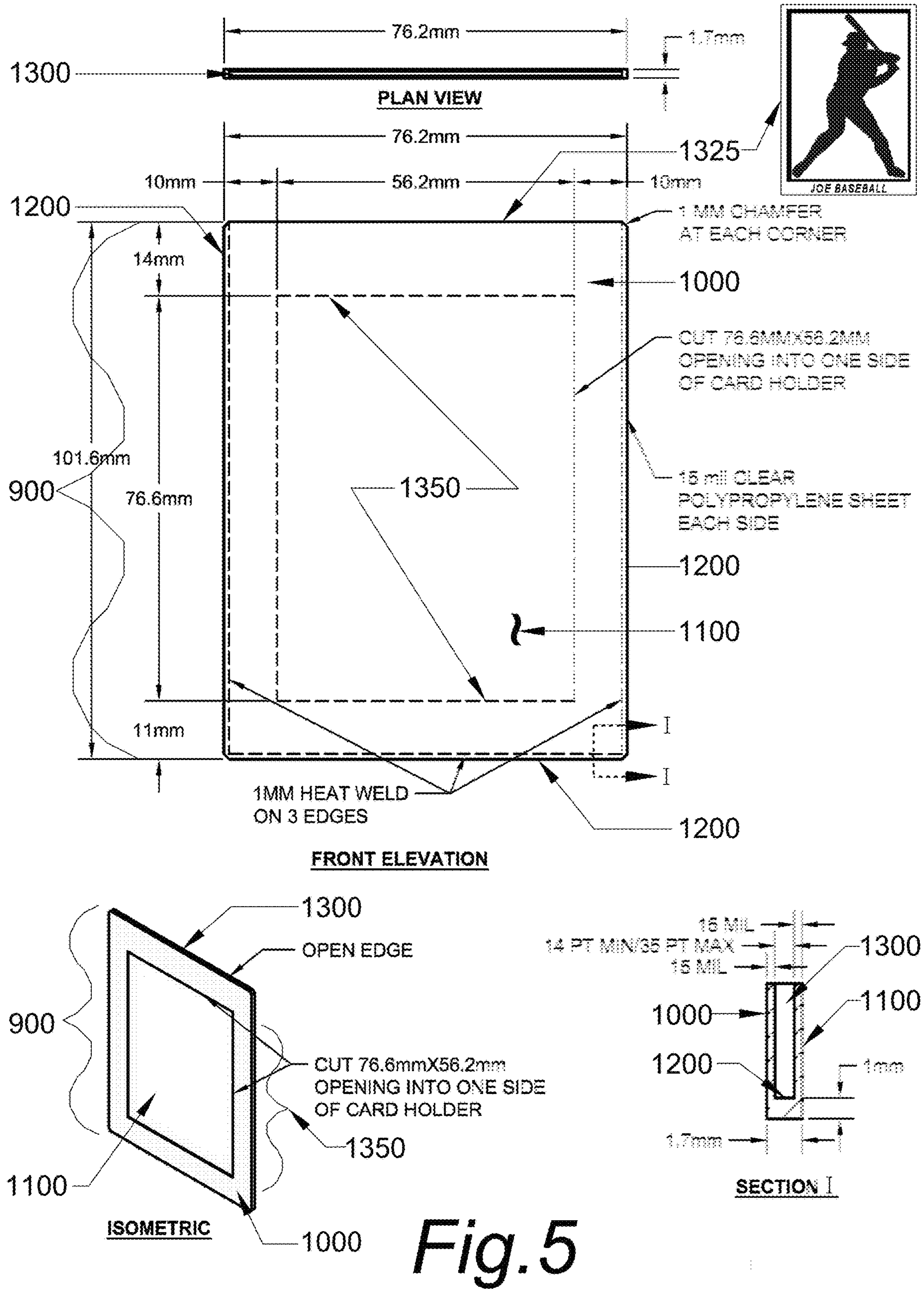
FIG. 5 illustrates a plan view, front elevation, and isometric representation of a signature card holder.

The facing 150 and flat signing surface 300 are arranged to create a three-sided slot 200 to hold a trading card 1325 (shown in FIG. 5) inserted into signature card holder 900 (shown in FIG. 5). The slot is formed from a lip that overlaps the flat signing surface 300 on three sides. The holding surface 100 and facing 150 are arranged to form a bottom surface 400 designed to keep the holder 50 in a stationary position while resting on a level surface.

For the holder 50 (baseball edition), several dimensions are listed to provide an understanding of the dimensional size and shape of the holder 50. These dimensions are exemplary, and a person of ordinary skill in the art would recognize that different dimensions could be used to form a holder 50 while achieving the same advantages of the claimed invention. The claimed invention should only be limited by the appended claims.

For example, the facing 150 may be 133.35 mm in horizontal length, and 117.86 mm in absolute vertical height. (Also, see FIG. 2.) Two of the lips (left and right sides) may be spaced apart by 69.85 mm as shown in FIG. 1. The overlap of the lips with the flat signing surface 300 near the top of the holder 50 form an opening to receive a trading card 1325 (shown in FIG. 5) inserted into signature card holder 900 (shown in FIG. 5), or equally, a trading card 1325 (shown in FIG. 5) by itself, or simply a card with a photo or message.

The holder 50 may be 133.35 mm in diameter and may be constructed of polyethylene. The front portion of the bottom surface 400 may have a measurement of 37.47 mm and the widest portion of the bottom surface 400 may have a measurement of 56.8 mm Methods of manufacturing may vary. dependent upon preferred available material. ranging from 3D printing to injection molding.

Figure 2:
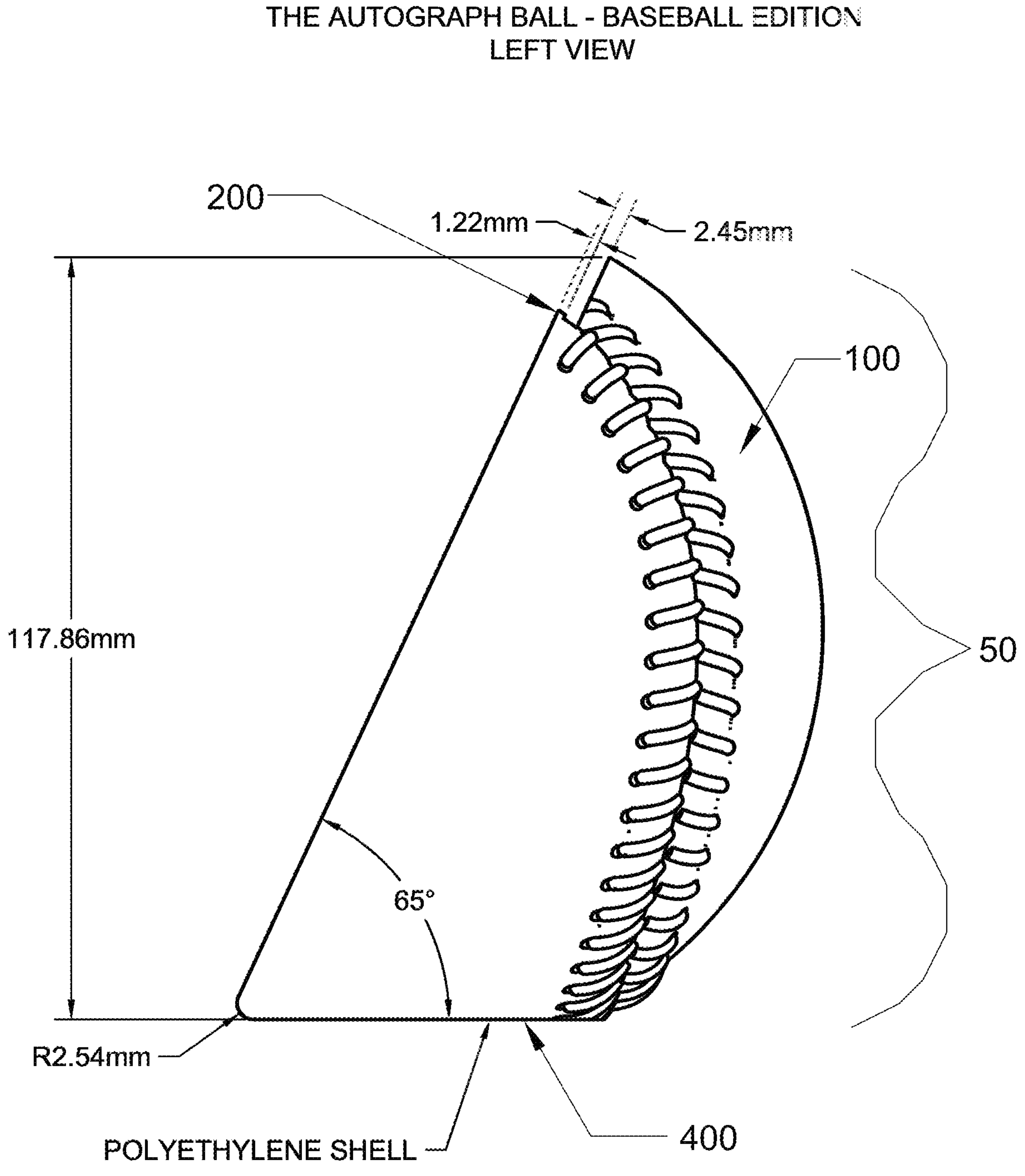
FIG. 2 illustrates a left view representation of a holder—baseball edition.

FIG. 2 is a left view representation of a holder 50 (baseball edition) measuring 117.86 mm (absolute vertical height) from top to bottom with visible curvature of holding surface 100 and slot 200 with bottom surface 400 arranged to keep the holder 50 in a stationary position while resting on a level surface. As clearly shown, the holding surface 100 may be designed with features representative of a sport object. For example, the threading used to sew a baseball together may be represented. Additionally, adhesive stickers, shrink wrap, paint, and/or outer skins may be applied to the holding surface 100, holder 50, and/or portions thereof, to add logos, information, and/or color.

FIG. 2 shows slot 200 formed from a recessed rectangular area of flat signing surface 300 (shown in FIG. 1) and a lip that overlaps the flat signing surface 300 (shown in FIG. 1). In this example, the lip may be spaced at a distance of 2.45 mm from the flat signing surface 300 (shown in FIG. 1) to form slot 200, and the lip may be 1.22 mm thick. A person of ordinary skill in the art would recognize these measurements may be varied. For example, the distance between the flat signing surface 300 (shown in FIG. 1) and the lip may be between 1 mm and 5 mm, inclusively, which would encompass the 2.45 mm distance used in this example. Furthermore, the lip may overlap the flat signing surface 300 (shown in FIG. 1) between 1 mm and 5 mm, inclusively. The facing 150 (shown in FIG. 1) has a radius of 2.54 mm and approximate angle of 65° with the bottom surface 400.

Figure 3:
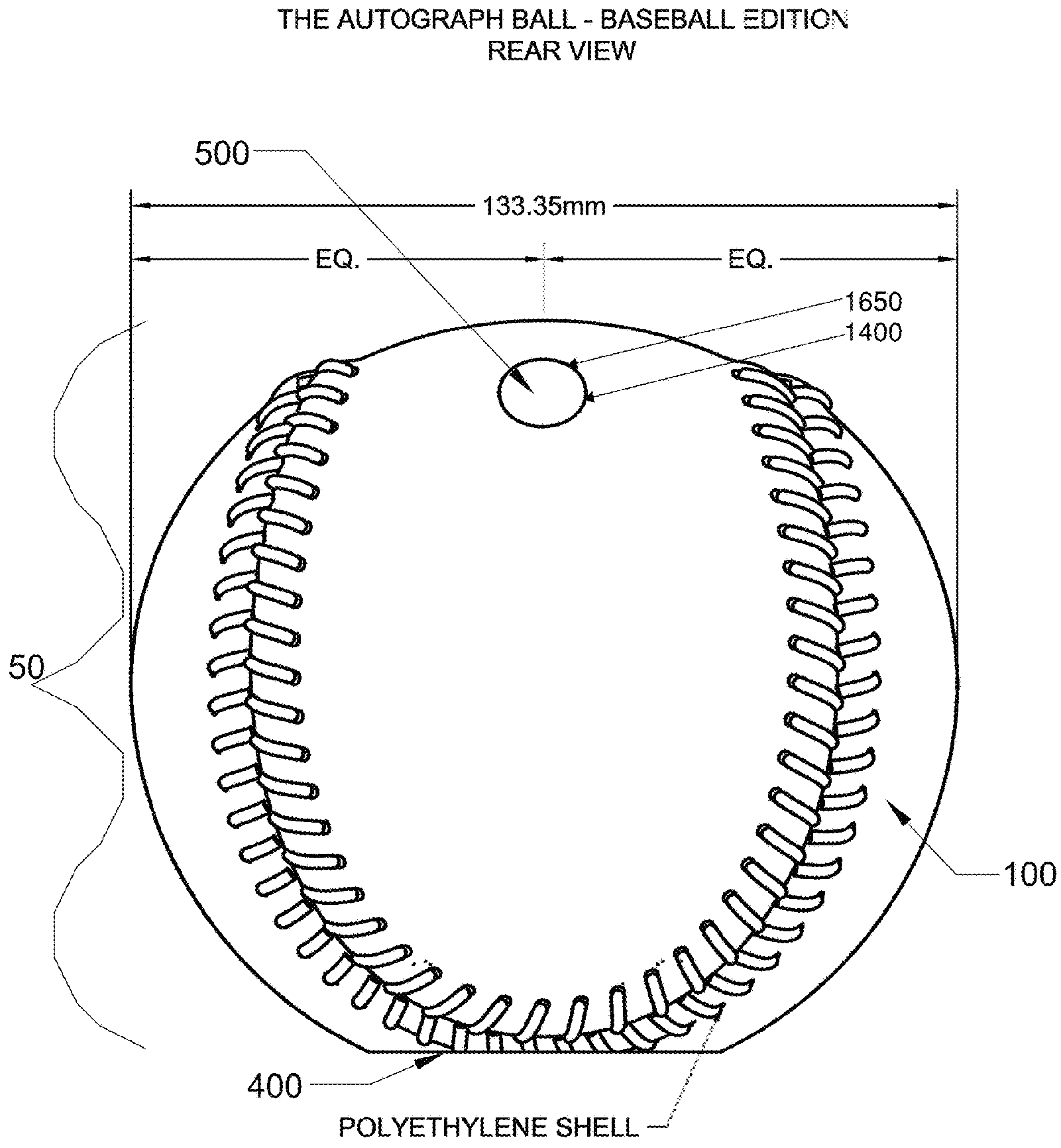
FIG. 3 illustrates a rear view representation of a holder—baseball edition.

FIG. 3 is a rear view representation of a holder 50 (baseball edition) measuring 133.35 mm in width with visible curvature of holding surface 100 and a hole 500 purposed for insertion of a Fine Point Sharpie Permanent Marker 1650 (shown in FIG. 18) when holder 50 is in use to obtain autographs. Equally, a pennant 1400 (shown in FIG. 17) may be inserted into hole 500 when the holder 50 is at rest. In this configuration, the holder 50 may hold the pennant 1400 (shown in FIG. 17) while displaying a trading card 1325 or image inserted into the signature card holder 900 (shown in FIG. 5), displayed on top of flat signing surface 300 and held in place by slot 200, while the holder 50 rests on a surface such as a shelf or desktop. Equally, a trading card 1325 or image may be displayed on top of flat signing surface 300 and held in place by slot 200 without the signature card holder 900.

Figure 4:
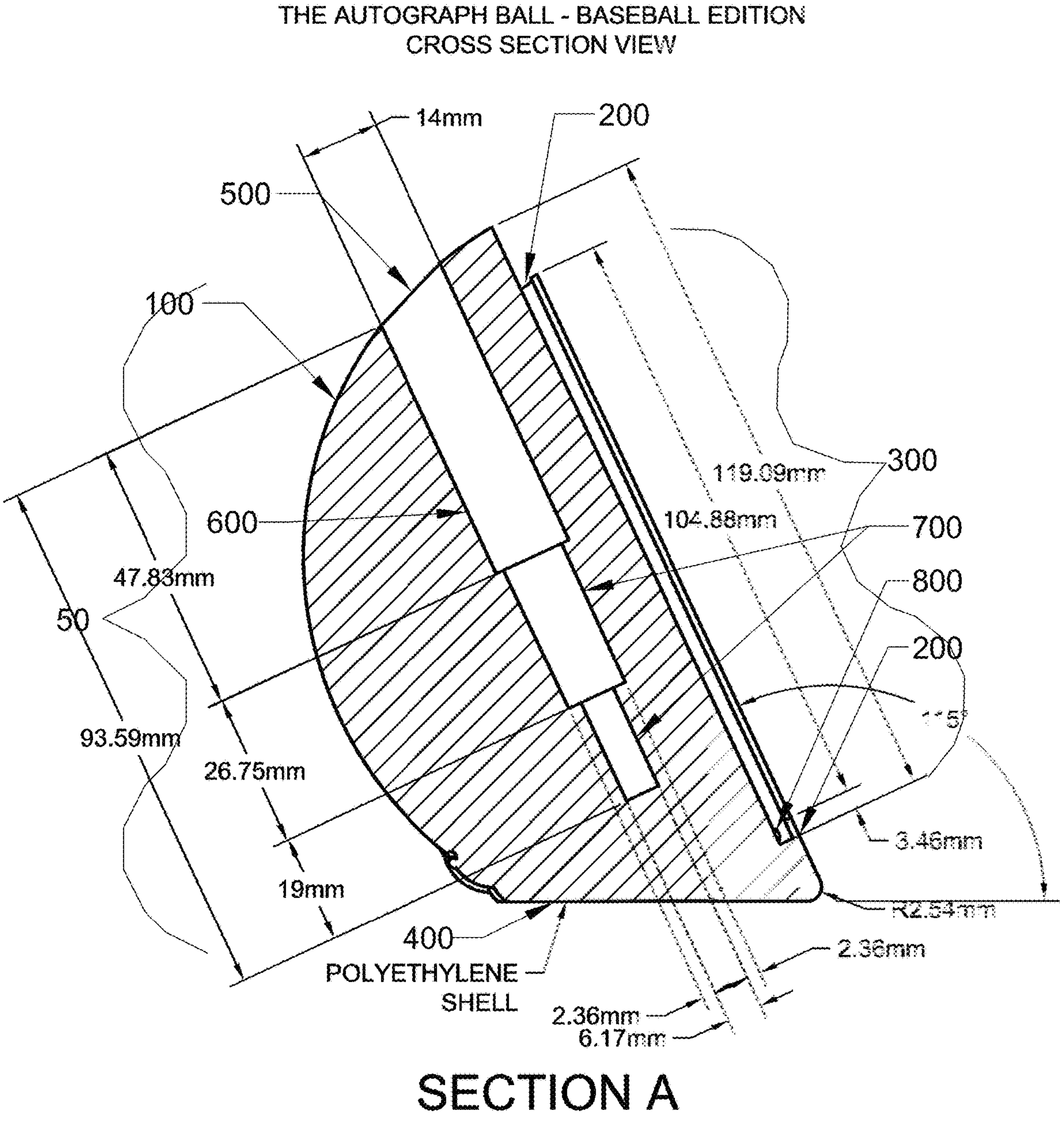
FIG. 4 illustrates a cross section view representation of a holder—baseball edition.

FIG. 4 is a cross section view representation of a holder 50 (baseball edition) with visible curvature of holding surface 100 and slot 200 to hold a signature card holder 900 (shown in FIG. 5). Pressure tabs 800 in combination with slot 200 provides a tight fit when holding a signature card holder 900 (shown in FIG. 5). A pressure tab may be a cylinder bisection 6.35 mm in length with hemispheres measuring 2.54 mm in diameter on both ends, and 0.6 mm in height. The cross section view of FIG. 4 shows a representation of a pressure tab located in a trough of the slot 200, near a bottom corner.

When in use as designed, the holder 50 is an effective tool for autograph collectors. The flat signing surface 300 provides a smooth area for a signature to be applied, for example, to a trading card 1325 (shown in FIG. 5). Cross section view of FIG. 4 provides a representation of the hole 500, shaft 600, and interference fit (female) 700. The interference fit (female) 700 may be arranged to provide a substantially air tight enclosure with at least a portion of a writing instrument including, but not limited to, a Fine Point Sharpie Permanent Marker (shown in FIG. 18, numbered 1650 in the drawing). The interference fit (female) 700 may be arranged to operate as a cap for the writing instrument. A stepped cylindrical shaft may include shaft 600 and interference fit (female) 700.

When at rest, the holder 50 may be used as a display. A personalized pennant 1400 (shown in FIG. 17) with an interference fit (male) 1800 (shown in FIG. 17) may be inserted in place of the Fine Point Sharpie Permanent Marker (shown in FIG. 18). The bottom surface 400 may be arranged to keep the holder 50 in a stationary position while resting on a level surface to enable a display.

FIG. 4 shows cross section view with measurements. The bottom of a flat signing surface 300 may be positioned 119.09 mm in length from a top of the holder 50. The facing 150 (shown in FIG. 1) may have a radius of 2.54 mm to join with the bottom surface 400, and be angled at 65 degrees with the bottom surface 400. As shown in FIG. 4, forming a lip of slot 200 may be measured at 104.88 mm in length and the lip overlap of the flat signing surface 300 measures 3.46 mm. The lip overlap of the flat signing surface 300 may be between 1 mm and 5 mm, inclusively.

FIG. 4 further shows a cross section view of the hole 500 being 14 mm in diameter leading to a stepped cylindrical shaft arranged in three sections, which includes shaft 600 and interference fit (female) 700. The stepped cylindrical shaft measures at least 93.59 mm A first section may have a 14 mm diameter measuring 47.83 mm in length. A second section may have a 10.89 mm diameter measuring 26.75 in length. A third and final section may have a 6.17 mm diameter and may be 19 mm in length.

FIG. 5 is a plan view representation of signature card holder 900 designed to insert a common trading card 1325 into an aperture (slot) 1300. Signature card holder 900 may measure 76.2 mm in width and 1.7 mm in depth.

FIG. 5 also shows a front elevation representation of a signature card holder 900 configured with a solid backing 1100 and a window frame (front) 1000 creating a window (front) 1350 exposing a trading card 1325 for the purpose of receiving an autograph. The window frame (front) 1000, which may be manufactured from a polypropylene sheet measuring 76.2 mm in width, 101.6 mm in height, and having a 15 mil thickness, may have a "cutout section" or window (front) 1350 measuring 56.2 mm in width and 76.6 mm in height. Window frame (front) 1000 may have a top portion measuring 14 mm, equal left and right portions measuring 10 mm, and a bottom portion measuring 11 mm. The backing 1100 of signature card holder 900, which may be constructed of a polypropylene sheet measuring 76.2 mm in width, 101.6 mm in height, and having a 15 mil thickness. The signature card holder 900, which may be constructed by applying a 1 mm heat weld on three edges creating welded edges 1200 and having a 1 mm chamfer at each corner. This design creates a 14 pt minimum to 35 pt maximum aperture (slot) 1300 at the top of the signature card holder 900. (Paper thickness is typically measured in points (i.e., pt), where 1 pt is equal to 0.001 inch.) Illustration of this construction is shown in Section I-I.

FIG. 5 also illustrates an isometric view of signature card holder 900 with window frame (front) 1000 with window (front) 1350, and backing 1100. Joining of the window frame (front) 1000 and backing 1100 may occur with welded edges 1200 creating an aperture (slot) 1300 at the top of the signature card holder 900. Window frame (front) 1000 having a cutout of 76.6 mm by 56.2 mm forming a window (front) 1350. This cutout allows for a celebrity athlete to use, for example, a Fine Point Sharpie Permanent Marker 1650 to apply a signature directly to a trading card 1325.

Figure 6:
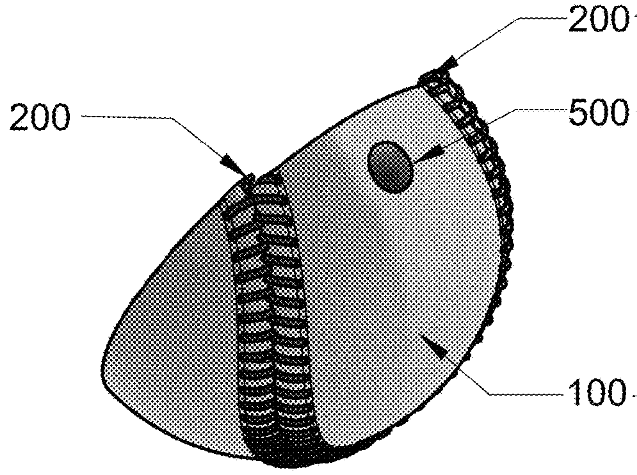
FIG. 6 illustrates a left rear isometric view of holder—baseball edition.

FIG. 6 is a left rear isometric view of holder 50 (baseball edition), designed to represent a portion of a baseball. The left rear isometric view of holder 50, shown in FIG. 6, shows a visible curvature of holding surface 100 and also shows hole 500 purposed for insertion of a Fine Point Sharpie Permanent Marker 1650 (shown in FIG. 18) when holder 50 is in use to obtain autographs. Equally, a pennant 1400 (shown in FIG. 17) may be inserted into hole 500 when the holder 50 is at rest. In this configuration, the holder 50 may hold the pennant 1400 (shown in FIG. 17). Also shown is a view of slot 200 to hold a signature card holder 900 (shown in FIG. 5).

Figure 7:
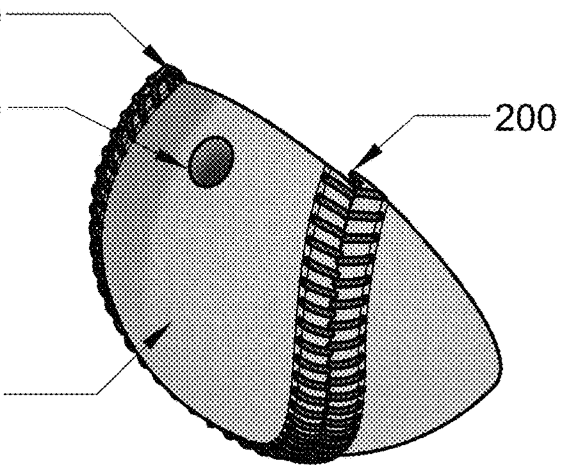
FIG. 7 illustrates a right rear isometric view of holder—baseball edition.

FIG. 7 is a right rear isometric view of holder 50 (baseball edition), designed to represent a portion of a baseball. The right rear isometric view of holder 50, shown in FIG. 7, shows a visible curvature of holding surface 100 and also shows hole 500 purposed for insertion of a Fine Point Sharpie Permanent Marker 1650 (shown in FIG. 18) when holder 50 is in use to obtain autographs. Equally, a pennant 1400 (shown in FIG. 17) may be inserted into hole 500 when the holder 50 is at rest. In this configuration, the holder 50 may hold the pennant 1400 (shown in FIG. 17). Also shown is a view of slot 200 to hold a signature card holder 900 (shown in FIG. 5).

Figure 8:
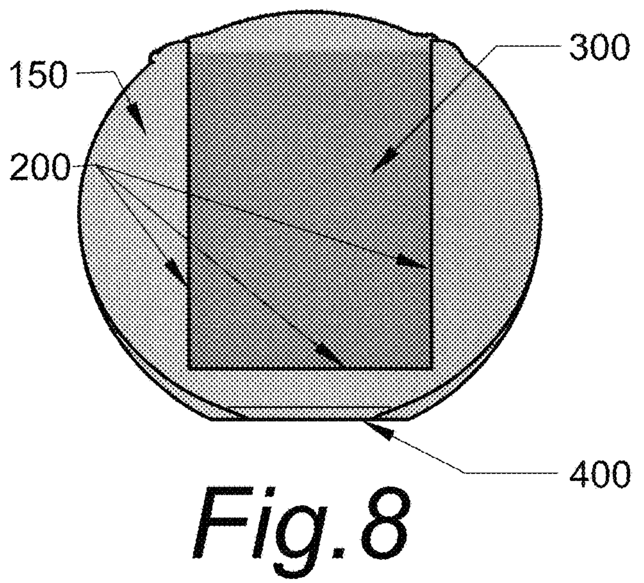
FIG. 8 illustrates a front view representation of a holder—baseball edition.

FIG. 8 is a front view representation of a holder 50 (baseball edition), designed to represent a portion of a baseball. The front view representation of holder 50, shown in FIG. 8, shows facing 150 that contains a flat signing surface 300. The flat signing surface 300 is recessed relative to the facing 150, with a plane aligned with the flat signing surface 300 being substantially parallel to a plane aligned with the facing 150. The facing 150 and flat signing surface

300 are arranged to create a three-sided slot 200 to hold a trading card 1325 (shown in FIG. 5) inserted into signature card holder 900 (shown in FIG. 5). A holding surface 100 (shown in FIGS. 6-7 and 9) and facing 150 are arranged to form a bottom surface 400 designed to keep the holder 50 in a stationary position while resting on a level surface.

Figure 9:
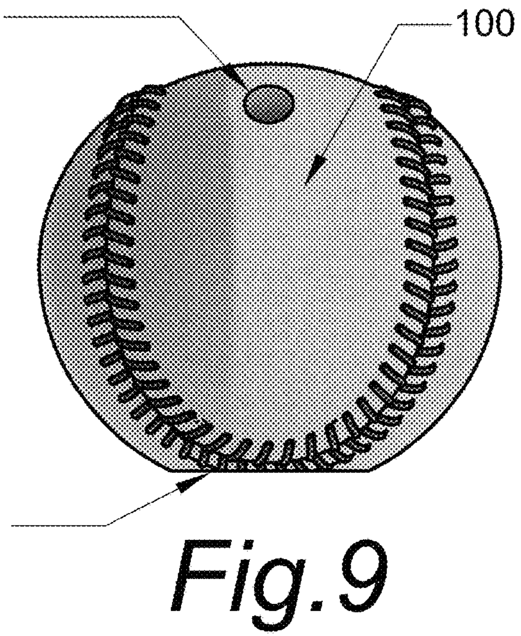
FIG. 9 illustrates a rear view representation of a holder—baseball edition.

FIG. 9 is a rear view representation of a holder 50 (baseball edition) with visible curvature of holding surface 100 and a hole 500 purposed for insertion of a Fine Point Sharpie Permanent Marker 1650 (shown in FIG. 18) when holder 50 is in use to obtain autographs. Equally, a pennant 1400 (shown in FIG. 17) may be inserted into hole 500 when the holder 50 is at rest. In this configuration, the holder 50 may hold the pennant 1400 (shown in FIG. 17) while displaying a trading card 1325 or image inserted into the signature card holder 900 (shown in FIG. 5), displayed on top of flat signing surface 300 and held in place by slot 200, while the holder 50 rests on a surface such as a shelf or desktop.

FIG. 10 is a left front isometric representation of a holder 50 (baseball edition) with visible curvature of holding surface 100, and also shows facing 150 that contains a flat signing surface 300. The flat signing surface 300 is recessed relative to the facing 150, with a plane aligned with the flat signing surface 300 being substantially parallel to a plane aligned with the facing 150. The facing 150 and flat signing surface 300 are arranged to create a three-sided slot 200 to hold a trading card 1325 (shown in FIG. 5) inserted into signature card holder 900 (shown in FIG. 5). Pressure tabs 800 in combination with slot 200 provides a tight fit when holding a signature card holder 900 (shown in FIG. 5). The flat signing surface 300 provides a smooth area for a signature to be applied, for example, to a trading card 1325 (shown in FIG. 5). When in use as designed, the holder 50 is an effective tool for autograph collectors.

FIG. 11 is a right front isometric representation of a holder 50 (baseball edition) with visible curvature of holding surface 100, and also shows facing 150 that contains a flat signing surface 300. The flat signing surface 300 is recessed relative to the facing 150, with a plane aligned with the flat signing surface 300 being substantially parallel to a plane aligned with the facing 150. The facing 150 and flat signing surface 300 are arranged to create a three-sided slot 200 to hold a trading card 1325 (shown in FIG. 5) inserted into signature card holder 900 (shown in FIG. 5). Pressure tabs 800 in combination with slot 200 provides a tight fit when holding a signature card holder 900 (shown in FIG. 5). The pressure tabs 800 are designed to engage with the edges of the signature card holder 900 (shown in FIG. 5) without applying pressure to a trading card 1325 (shown in FIG. 5) inserted into signature card holder 900 (shown in FIG. 5). As such, the possibility of marring a trading card 1325 (shown in FIG. 5) may be greatly reduced. The flat signing surface 300 provides a smooth area for a signature to be applied, for example, to a trading card 1325 (shown in FIG. 5). When in use as designed, the holder 50 is an effective tool for autograph collectors.

FIG. 12 is a left view representation of a holder 50 (baseball edition) with visible curvature of holding surface 100 and slot 200 with bottom surface 400 arranged to keep the holder 50 in a stationary position while resting on a level surface. As clearly shown, the holding surface 100 may be designed with features representative of a sport object. For example, the threading used to sew a baseball together may be represented. Additionally, adhesive stickers, shrink wrap, paint, and/or outer skins may be applied to the holding surface 100, holder 50, and/or portions thereof, to add logos, information, and/or color.

FIG. 13 is a right view representation of a holder 50 (baseball edition) with visible curvature of holding surface 100 and slot 200 with bottom surface 400 arranged to keep the holder 50 in a stationary position while resting on a level surface. As clearly shown, the holding surface 100 may be designed with features representative of a sport object. For example, the threading used to sew a baseball together may be represented. Additionally, adhesive stickers, shrink wrap, paint, and/or outer skins may be applied to the holding surface 100, holder 50, and/or portions thereof, to add logos, information, and/or color.

Figure 14:
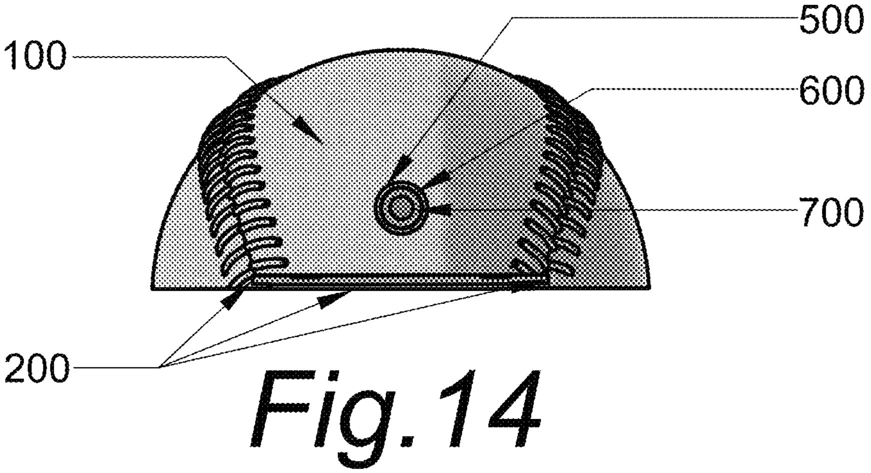
FIG. 14 illustrates a top view representation of holder—baseball edition.

FIG. 14 is a top view representation of a holder 50 (baseball edition) with visible curvature of holding surface 100 and slot 200. A hole 500, shaft 600, and interference fit (female) 700 are shown. The interference fit (female) 700 may be arranged to provide a substantially air tight enclosure with at least a portion of a writing instrument including but not limited to a Fine Point Sharpie Permanent Marker (shown in FIG. 18 as element 1650) The interference fit (female) 700 may be arranged to operate as a cap for the writing instrument. A personalized pennant 1400 (shown in FIG. 17) with an interference fit (male) 1800 (shown in FIG. 17) may be inserted in place of the Fine Point Sharpie Permanent Marker (shown in FIG. 18).

Figure 15:
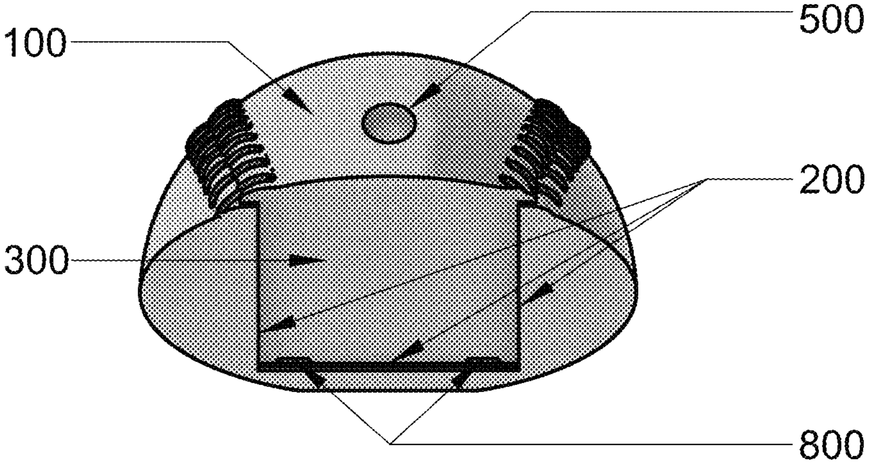
FIG. 15 illustrates an isometric top view representation of holder—baseball edition.

FIG. 15 is an isometric top view representation of a holder 50 (baseball edition) with a visible curvature of holding surface 100. A flat signing surface 300 is recessed relative to a facing 150 (shown in FIG. 1), with a plane aligned with the flat signing surface 300 being substantially parallel to a plane aligned with the facing 150. The facing 150 and flat signing surface 300 are arranged to create a three-sided slot 200 to hold a trading card 1325 (shown in FIG. 5) inserted into signature card holder 900 (shown in FIG. 5). Pressure tabs 800 in combination with slot 200 provides a tight fit when holding a signature card holder 900 (shown in FIG. 5). The flat signing surface 300 provides a smooth area for a signature to be applied, for example, to a trading card 1325 (shown in FIG. 5). When in use as designed, the holder 50 is an effective tool for autograph collectors.

Figure 16:
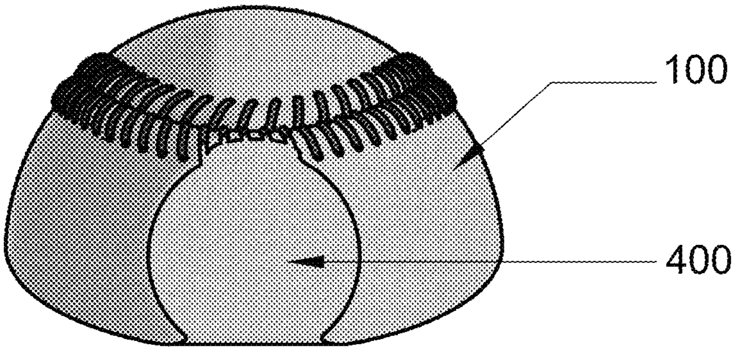
FIG. 16 illustrates a bottom view representation of holder—baseball edition.

FIG. 16 is a bottom view representation of a holder 50 (baseball edition) with visible curvature of holding surface 100. The bottom surface 400 may be designed to keep the holder 50 in a stationary position while resting on a level surface.

Figure 17:
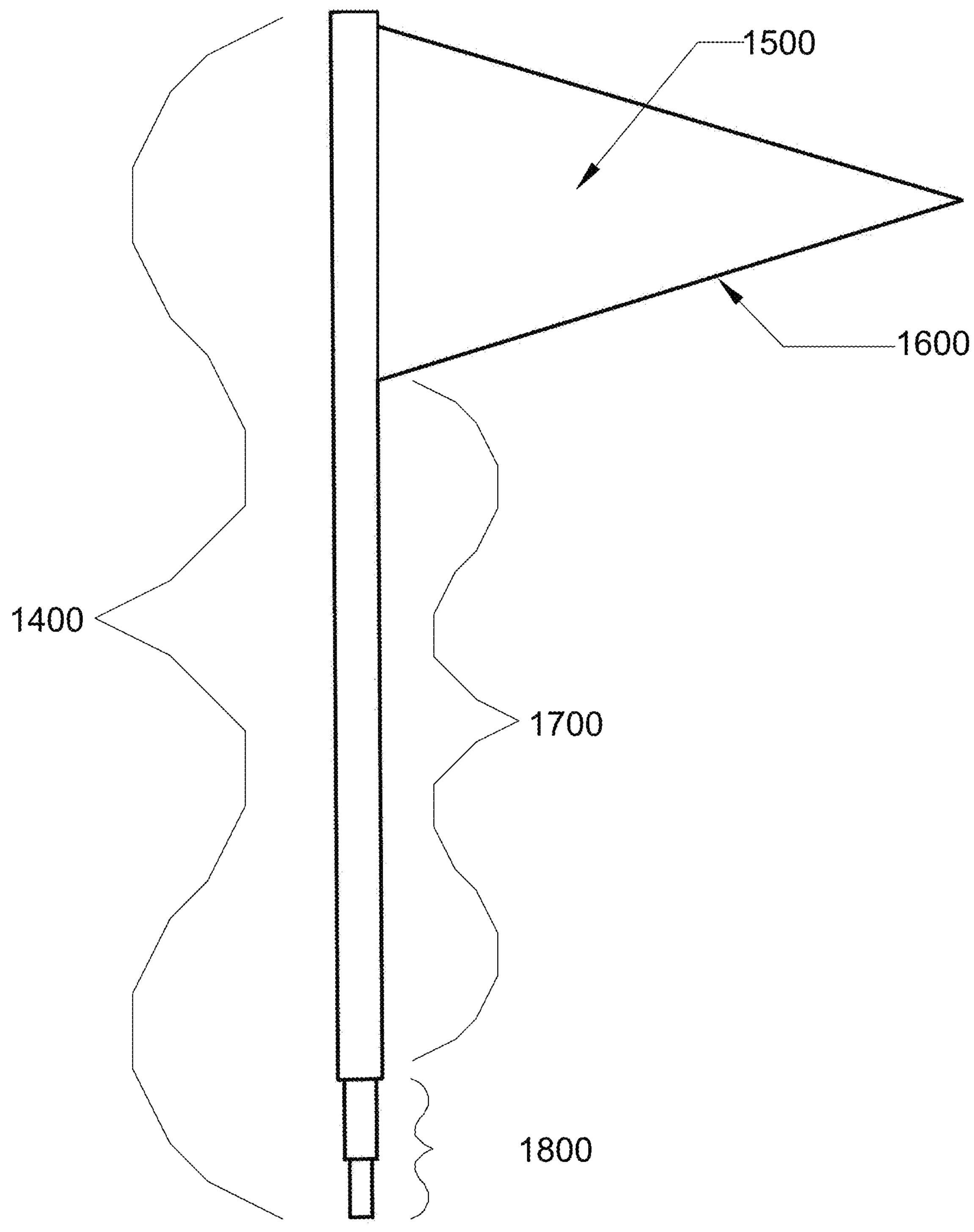
FIG. 17 illustrates a front view representation of a pennant.
Figure 18:
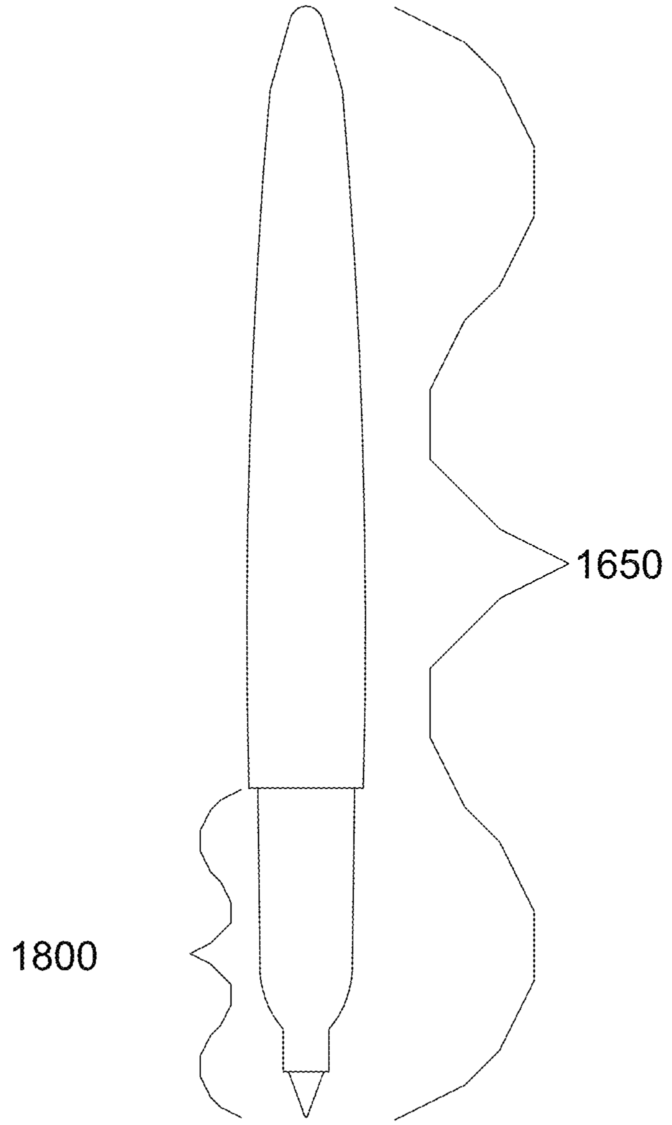
FIG. 18 illustrates an artistic representation of a Fine Point Sharpie Permanent Marker.

FIG. 17 is a front view representation of a personalized pennant 1400 with stick 1700 and an interference fit (male) 1800 when inserted into hole 500 in place of the Fine Point Sharpie Permanent Marker (shown in FIG. 18). Additionally, adhesive stickers, shrink wrap, paint, printing, and/or engraving may be applied to the front 1500 and/or back 1600 of pennant 1400 and/or portions thereof, to add logos; information such as a team name, team mascot, and year; and/or color.

FIG. 18 is an artistic representation of a Fine Point Sharpie Permanent Marker 1650 that has an interference fit (male) 1800, which may be inserted into hole 500 using the stepped cylindrical shaft in holder 50 (shown in FIG. 4.) Holder 50, hole 500, shaft 600, and interference fit (female) 700 (shown in FIG. 4.) are arranged to retain a writing instrument when holder 50 is in use to obtain autographs. The writing instrument may be at least one of a Sharpie branded pen, a felt tip pen, a ball point pen, and a pencil.

Figure 19:
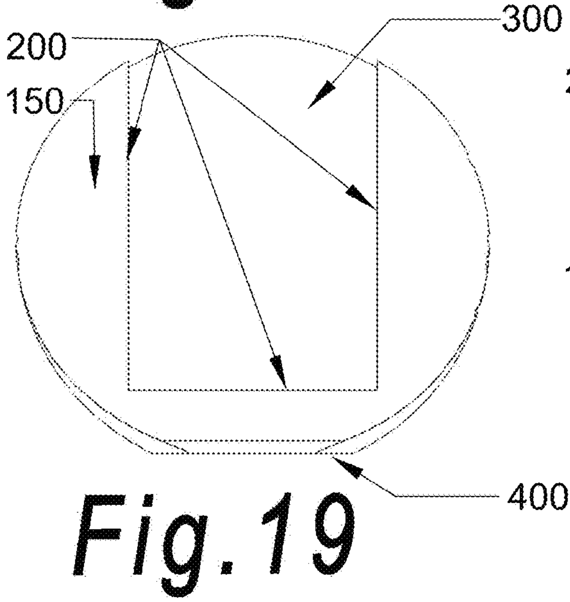
FIG. 19 illustrates a front view representation of a holder—basketball edition.

FIG. 19 is a front view representation of a holder 50 (basketball edition), designed to represent a portion of a basketball. The front view representation of holder 50 shows facing 150 that contains a flat signing surface 300. The flat signing surface 300 is recessed relative to the facing 150, with a plane aligned with the flat signing surface 300 being substantially parallel to a plane aligned with the facing 150. The facing 150 and flat signing surface 300 are arranged to create a three-sided slot 200 to hold a trading card 1325 (shown in FIG. 5) inserted into signature card holder 900 (shown in FIG. 5). The holding surface 100 and facing 150 are arranged to form a bottom surface 400 designed to keep the holder 50 in a stationary position while resting on a level surface.

Figure 20:
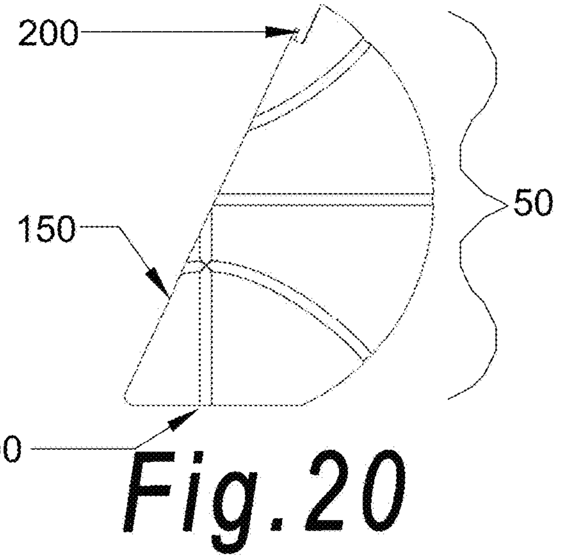
FIG. 20 illustrates a right view representation of a holder—basketball edition.

FIG. 20 is a right view representation of a holder 50 (basketball edition) with slot 200 used to hold a trading card 1325 (shown in FIG. 5) inserted into signature card holder 900 (shown in FIG. 5). The holder 50 has a facing 150, and a bottom surface 400 arranged to keep the holder 50 in a stationary position while resting on a level surface.

Figure 21:
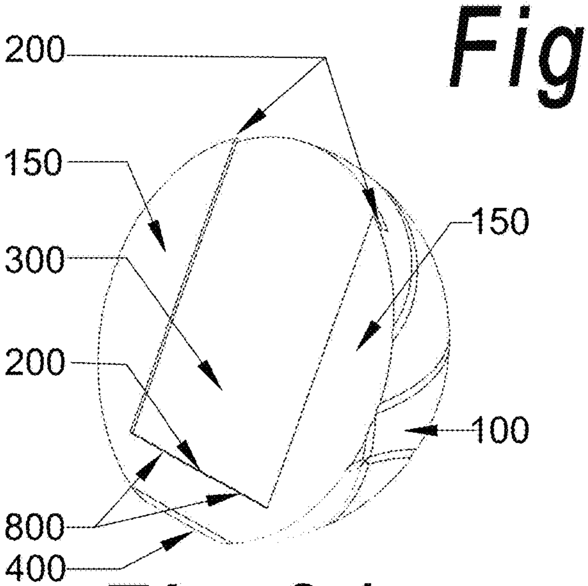
FIG. 21 illustrates a right front isometric representation of a holder—basketball edition.

FIG. 21 is a right front isometric representation of a holder 50 (basketball edition) with visible curvature of holding surface 100. As clearly shown, the holding surface 100 may be designed with features representative of a sport object. For example, the materials used to fashion a basketball are represented. Additionally, adhesive stickers, shrink wrap, paint, and/or outer skins may be applied to the holding surface 100, holder 50, and/or portions thereof, to add logos, information, and/or color. Right front isometric representation of holder 50 also shows facing 150 that contains a flat signing surface 300. The flat signing surface 300 is recessed relative to the facing 150, with a plane aligned with the flat signing surface 300 being substantially parallel to a plane aligned with the facing 150. The facing 150 and flat signing surface 300 are arranged to create a three-sided slot 200 to hold a trading card 1325 (shown in FIG. 5) inserted into signature card holder 900 (shown in FIG. 5). The holding surface 100 and facing 150 are arranged to form a bottom surface 400 designed to keep the holder 50 in a stationary position while resting on a level surface. Pressure tabs 800 in combination with slot 200 provides a tight fit when holding a signature card holder 900 (shown in FIG. 5). The flat signing surface 300 provides a smooth area for a signature to be applied, for example, to a trading card 1325 (shown in FIG. 5). When in use as designed, the holder 50 is an effective tool for autograph collectors.

Figure 22:
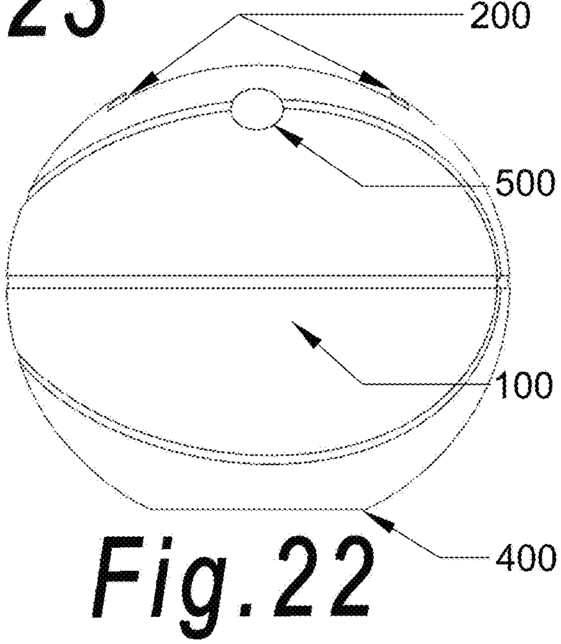
FIG. 22 illustrates a rear view representation of a holder—basketball edition.

FIG. 22 is a rear view representation of a holder 50 (basketball edition) with visible curvature of holding surface 100 and a hole 500 purposed for insertion of a Fine Point Sharpie Permanent Marker 1650 (shown in FIG. 18) when holder 50 is in use to obtain autographs. Equally, a pennant 1400 (shown in FIG. 17) may be inserted into hole 500 when the holder 50 is at rest. In this configuration, the holder 50 may hold the pennant 1400 (shown in FIG. 17) while displaying a trading card 1325 or image inserted into the signature card holder 900 (shown in FIG. 5), displayed on top of flat signing surface 300 and held in place by slot 200, while the holder 50 rests on a surface such as a shelf or desktop.

Figure 23:
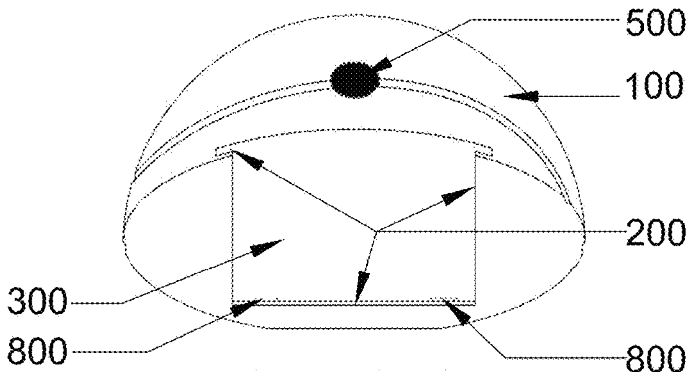
FIG. 23 illustrates an isometric top view representation of holder—basketball edition.

FIG. 23 is an isometric top view representation of a holder 50 (basketball edition) with visible curvature of holding surface 100, and also shows a flat signing surface 300. The flat signing surface 300 is recessed relative to a facing 150 (shown in FIG. 21), with a plane aligned with the flat signing surface 300 being substantially parallel to a plane aligned with the facing 150. The facing 150 and flat signing surface 300 are arranged to create a three-sided slot 200 to hold a trading card 1325 (shown in FIG. 5) inserted into signature card holder 900 (shown in FIG. 5). Pressure tabs 800 in combination with slot 200 provides a tight fit when holding a signature card holder 900 (shown in FIG. 5). The flat signing surface 300 provides a smooth area for a signature to be applied, for example, to a trading card 1325 (shown in FIG. 5). When in use as designed, the holder 50 is an effective tool for autograph collectors.

Figure 24:
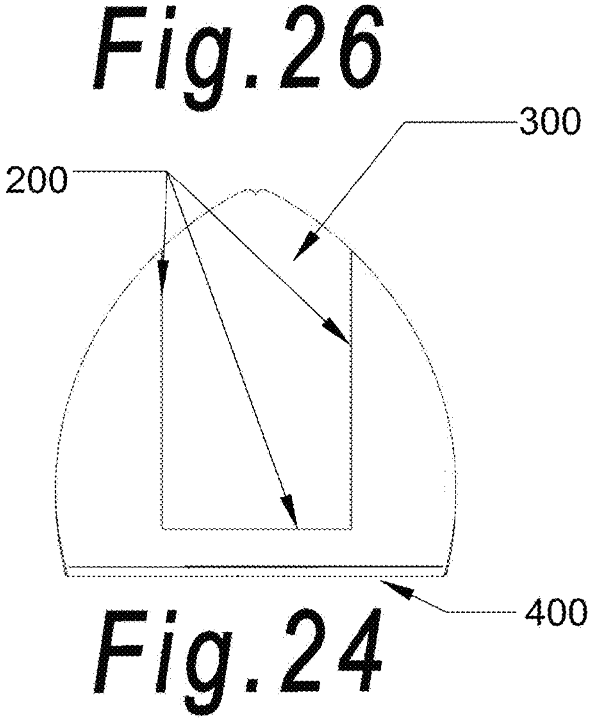
FIG. 24 illustrates a front view representation of a holder—football edition.

FIG. 24 is a front view representation of a holder 50 (football edition), designed to represent a portion of a football. The front view representation of holder 50 shows a flat signing surface 300 arranged to create a three-sided slot 200 to hold a trading card 1325 (shown in FIG. 5) inserted into signature card holder 900 (shown in FIG. 5).

Figure 25:
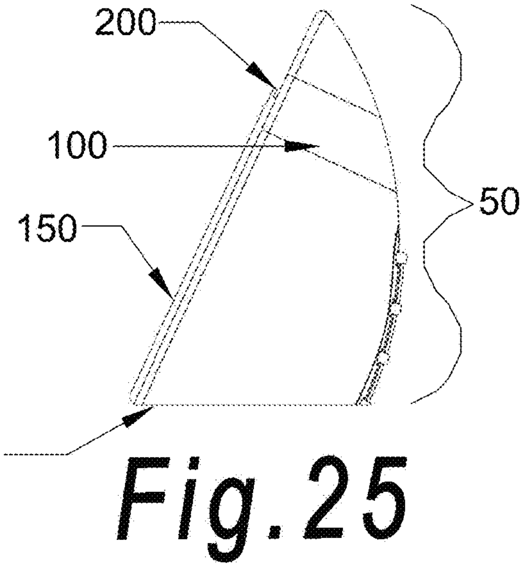
FIG. 25 illustrates a right view representation of a holder—football edition.
Figure 38:
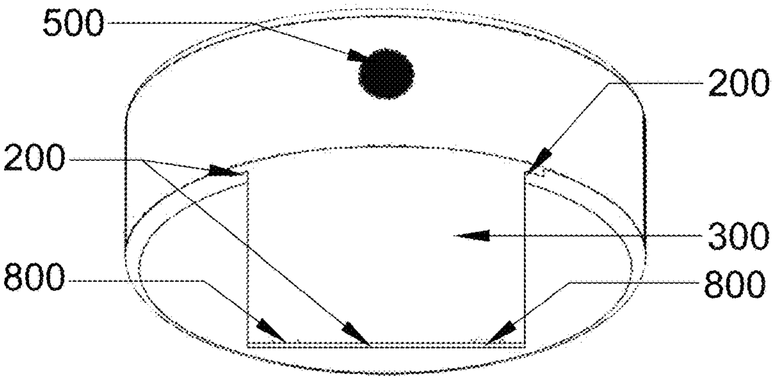
FIG. 38 illustrates an isometric top view representation of holder—auto racing edition.
Figure 36:
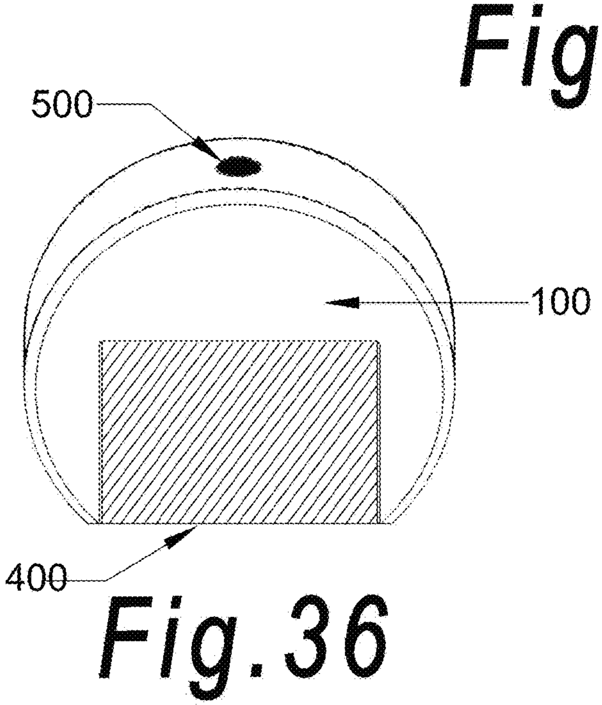
FIG. 36 illustrates a rear view representation of a holder—auto racing edition.
Figure 37:
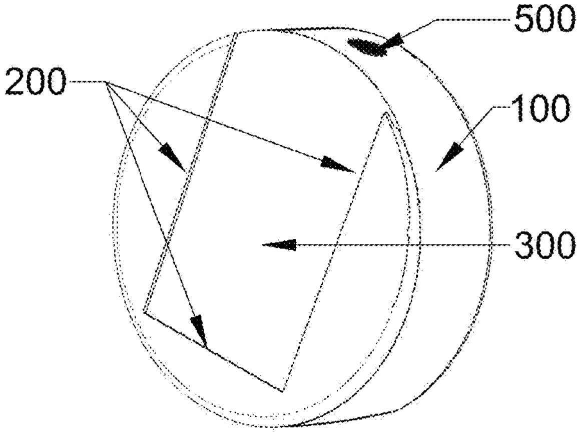
FIG. 37 illustrates a right front isometric representation of a holder—auto racing edition.
Figure 34:
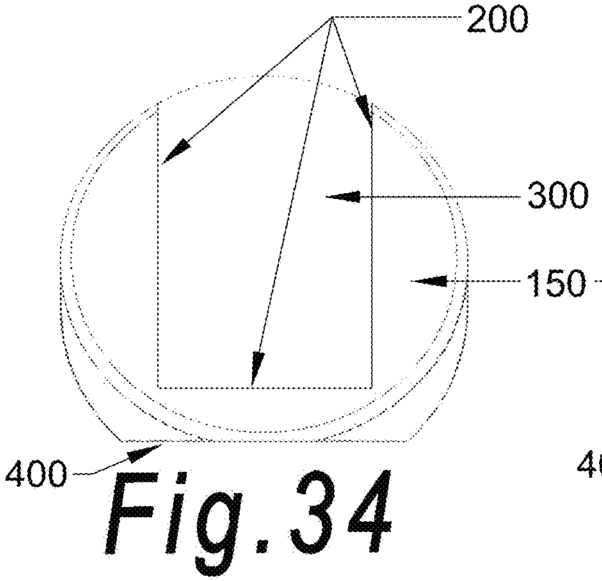
FIG. 34 illustrates a front view representation of a holder designed to represent a portion of an auto racing.
Figure 35:
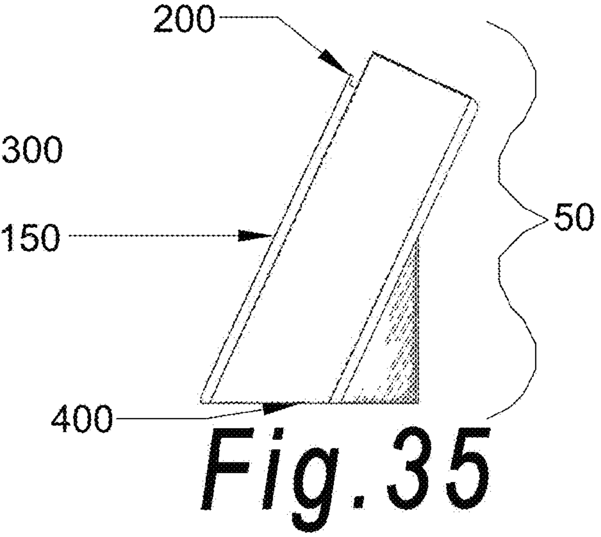
FIG. 35 illustrates a right view representation of a holder—auto racing edition.
Figure 43:
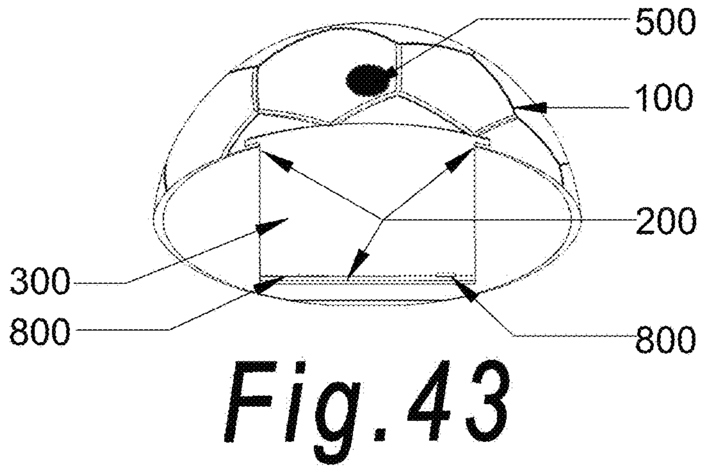
FIG. 43 illustrates an isometric top view representation of holder—soccer edition.
Figure 41:
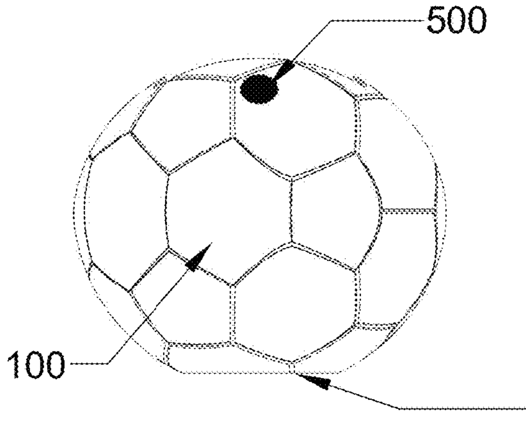
FIG. 41 illustrates a rear view representation of a holder—soccer edition.
Figure 42:
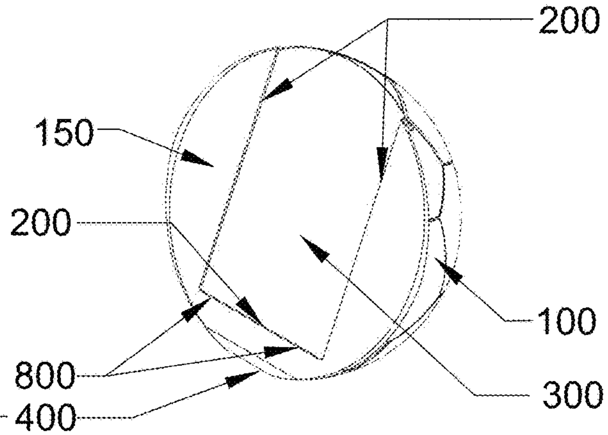
FIG. 42 illustrates a right front isometric representation of a holder—soccer edition.
Figure 39:
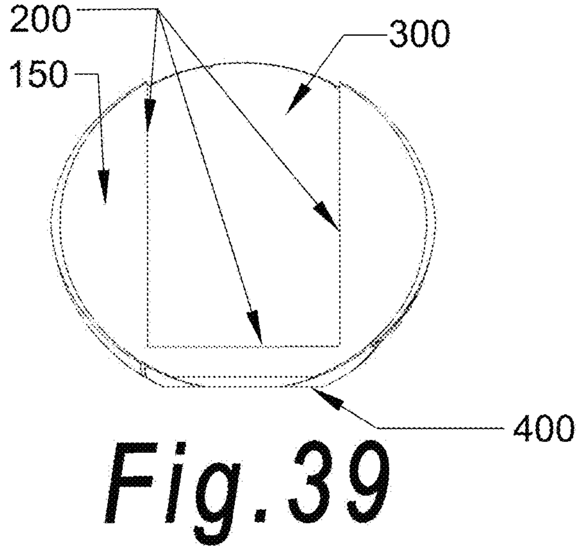
FIG. 39 illustrates a front view representation of a holder designed to represent a portion of a soccer ball.
Figure 40:
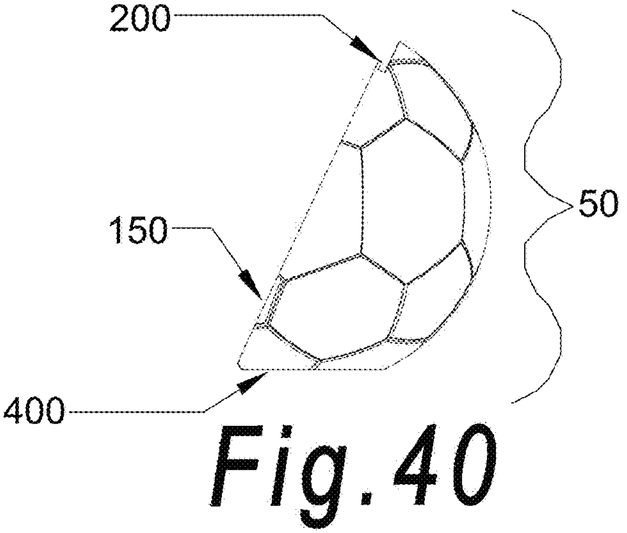
FIG. 40 illustrates a right view representation of a holder—soccer edition.
Figure 48:
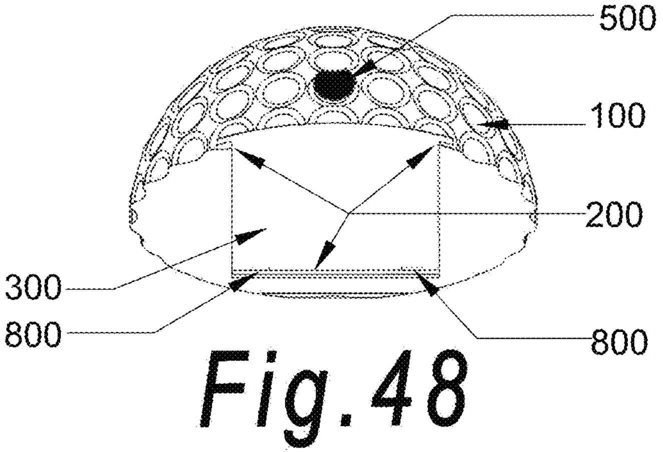
FIG. 48 illustrates an isometric top view representation of holder—golf edition.
Figure 46:
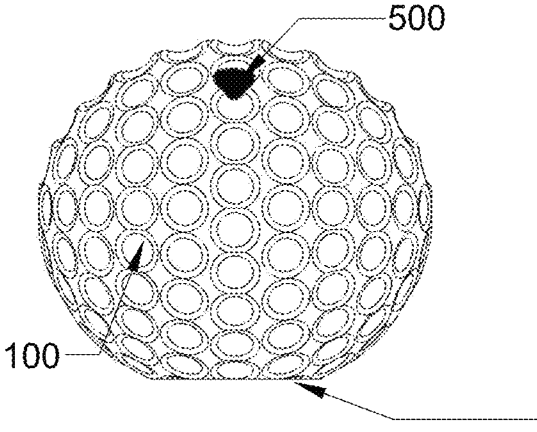
FIG. 46 illustrates a rear view representation of a holder—golf edition.
Figure 47:
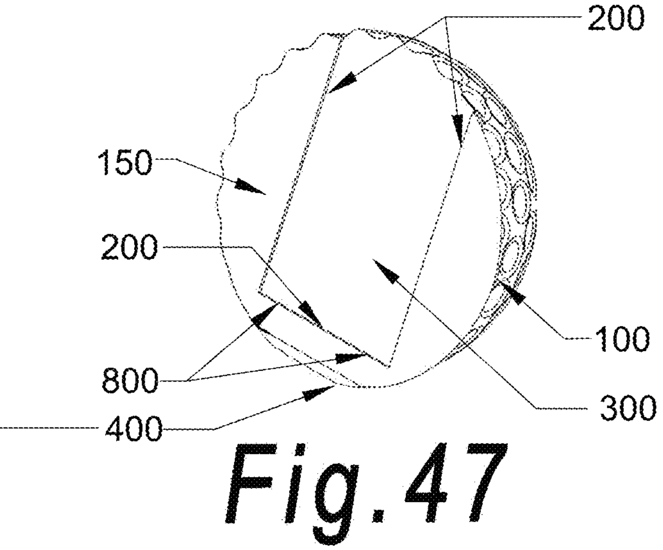
FIG. 47 illustrates a right front isometric representation of a holder—golf edition.
Figure 44:
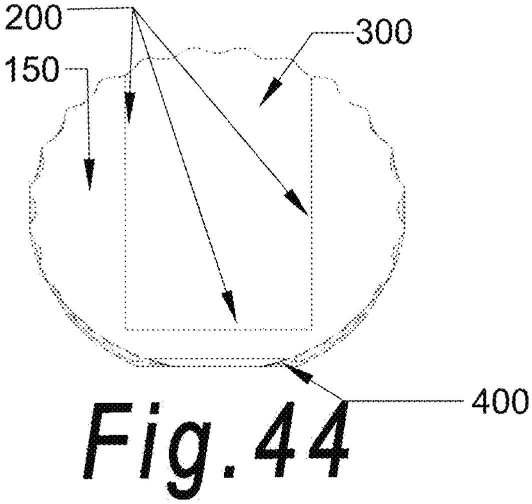
FIG. 44 illustrates a front view representation of a holder designed to represent a portion of a golf ball.
Figure 45:
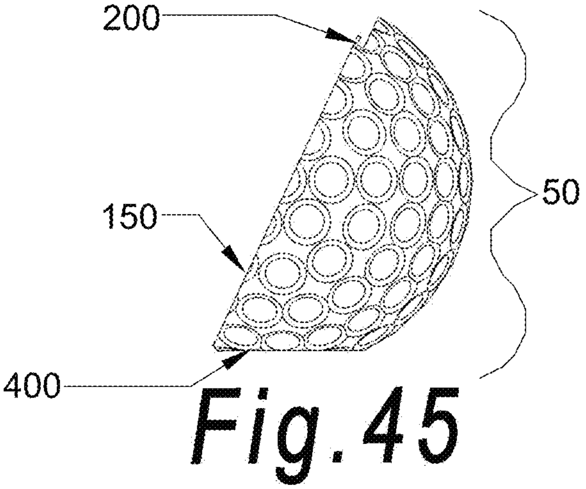
FIG. 45 illustrates a right view representation of a holder—golf edition.
Figure 53:
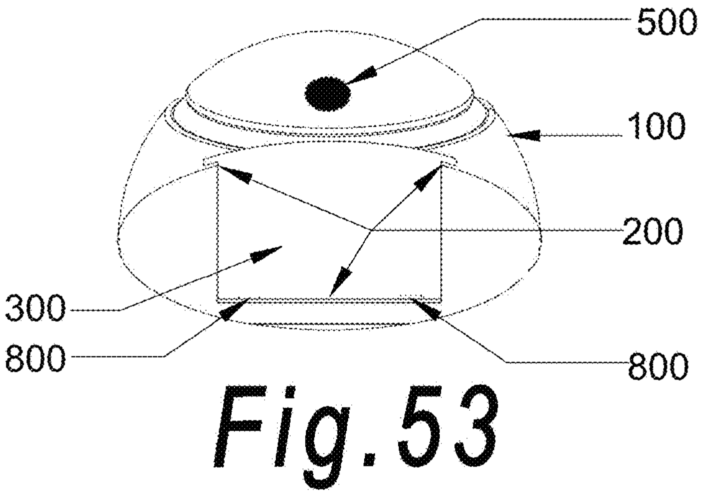
FIG. 53 illustrates an isometric top view representation of a holder—tennis edition.
Figure 51:
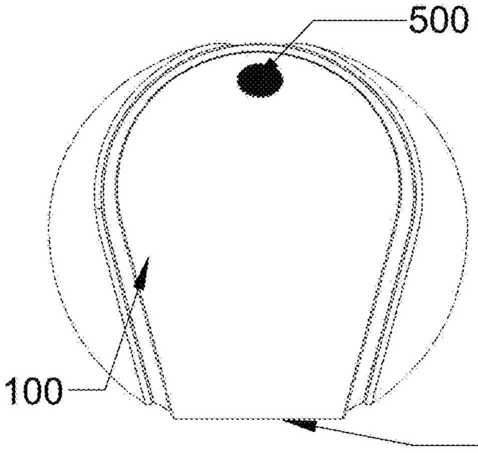
FIG. 51 illustrates a rear view representation of a holder—tennis edition.
Figure 52:
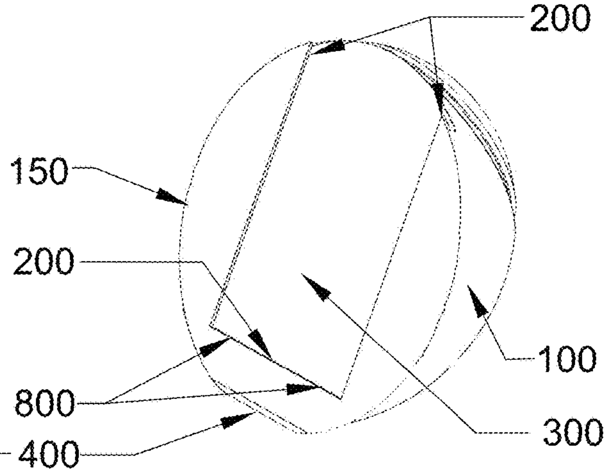
FIG. 52 illustrates a right front isometric representation of a holder tennis edition.
Figure 49:
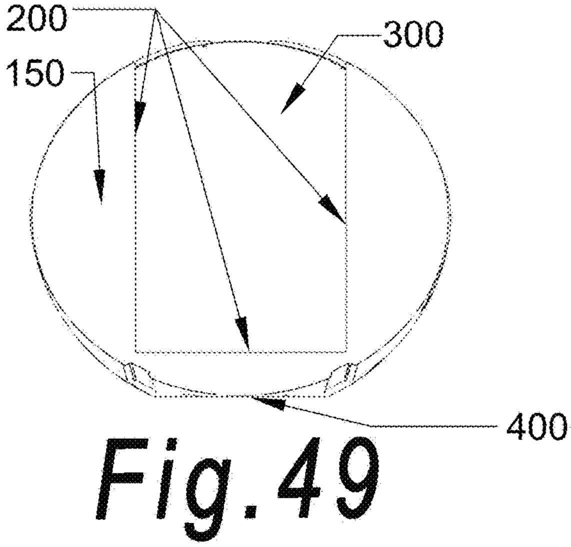
FIG. 49 illustrates a front view representation of a holder designed to represent a portion of a tennis ball.
Figure 50:
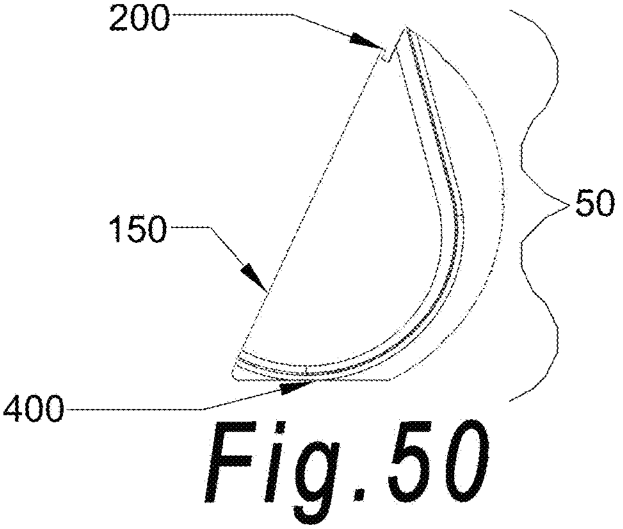
FIG. 50 illustrates a right view representation of a holder—tennis edition.
Figure 56:
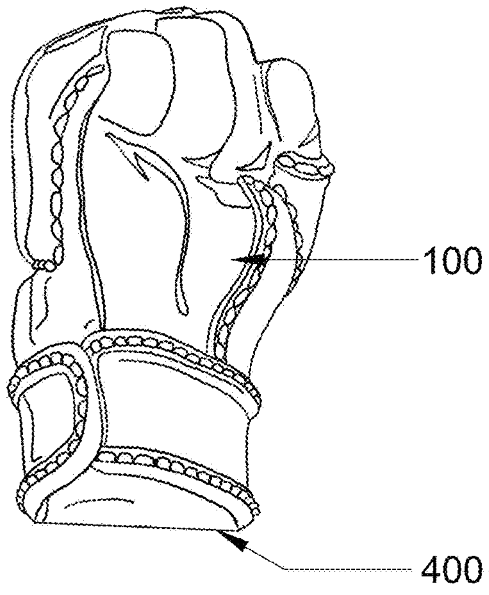
FIG. 56 illustrates a rear view representation of a holder—mixed martial arts edition.
Figure 57:
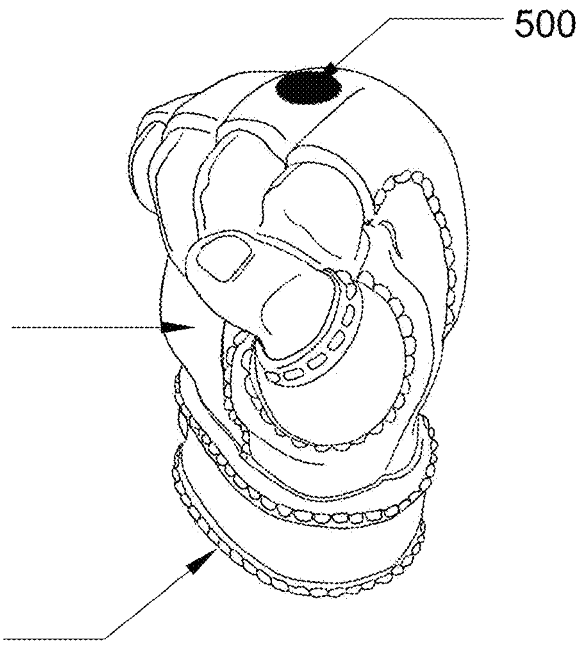
FIG. 57 illustrates a rear view representation of a holder—mixed martial arts edition.
Figure 54:
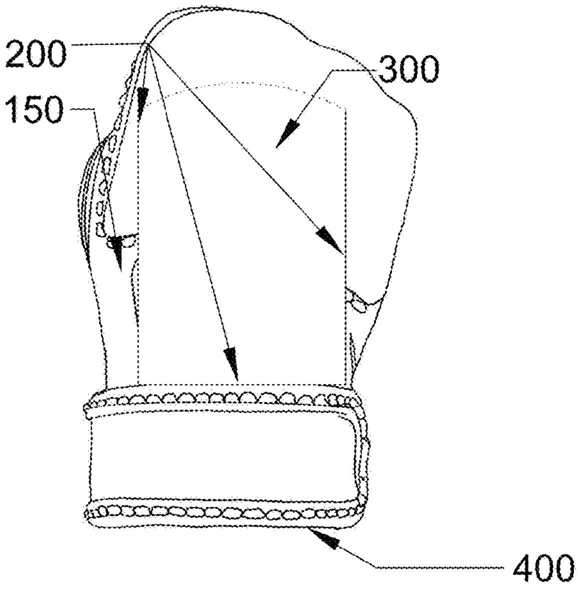
FIG. 54 illustrates a front view representation of a holder designed to represent a portion of a mixed martial arts glove.
Figure 55:
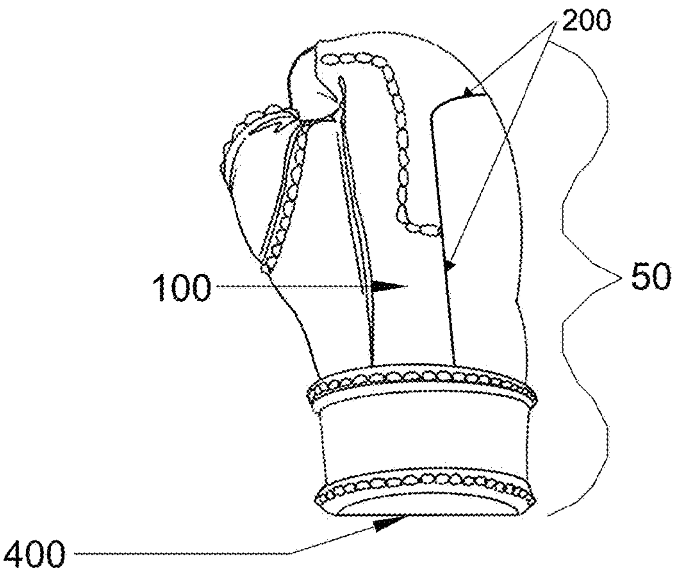
FIG. 55 illustrates a right view representation of a holder—mixed martial arts edition.
Figure 60:
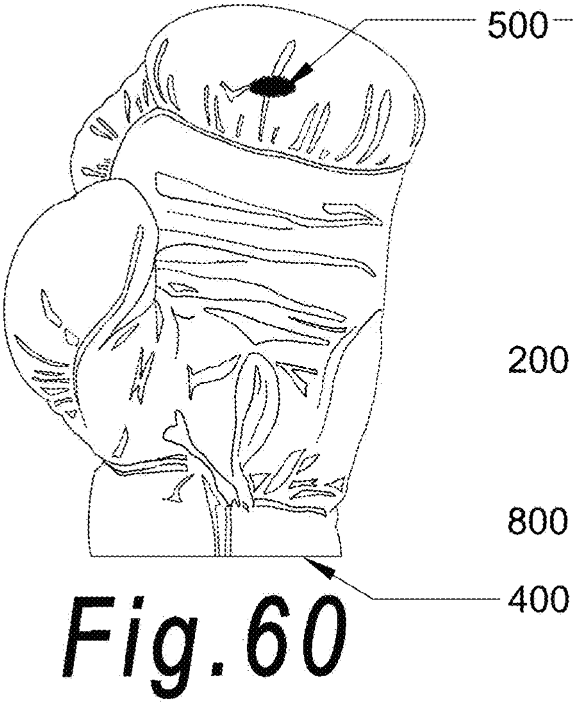
FIG. 60 illustrates a rear view representation of a holder—boxing edition.
Figure 61:
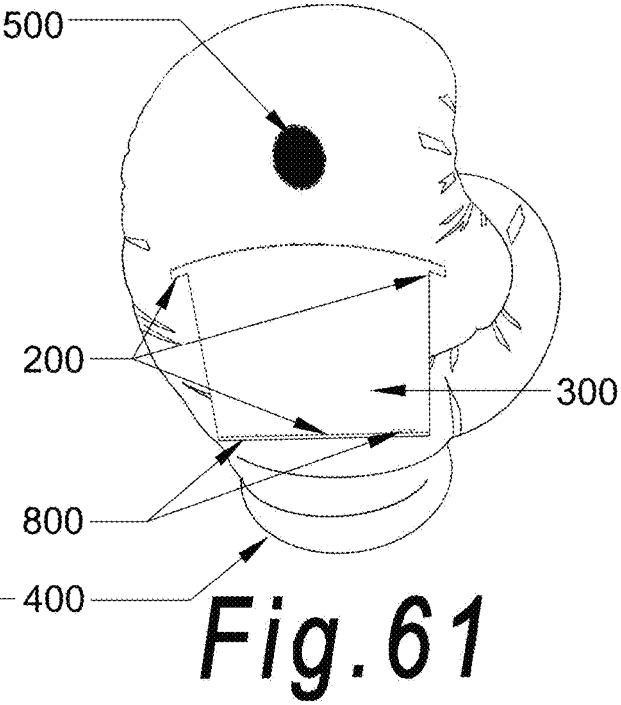
FIG. 61 illustrates an isometric top view representation of a holder—boxing edition.
Figure 58:
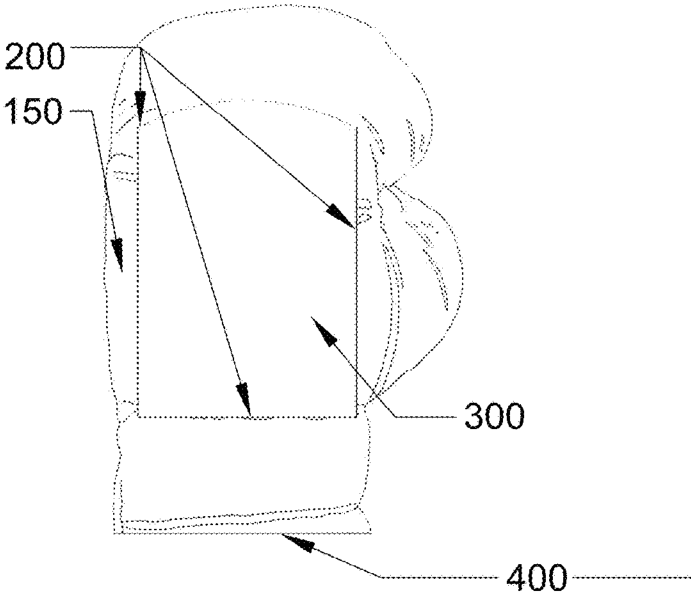
FIG. 58 illustrates a front view representation of a holder designed to represent a portion of a boxing glove.
Figure 59:
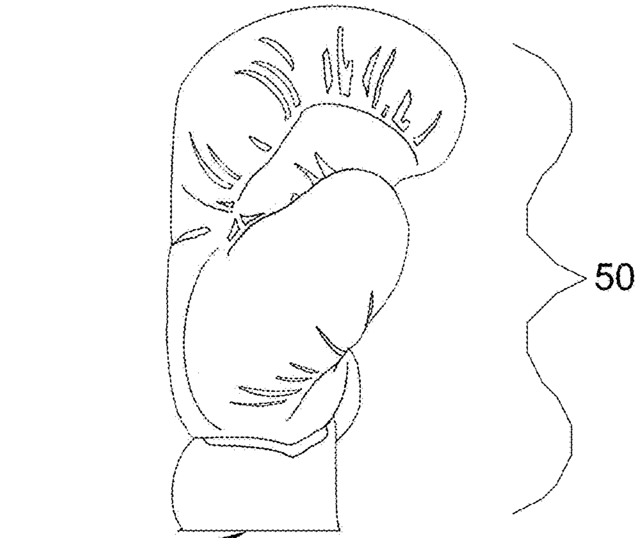
FIG. 59 illustrates a right view representation of a holder—boxing edition.

FIG. 25 is a right view representation of a holder 50 (football edition) with visible curvature of holding surface 100, slot 200, and a bottom surface 400 arranged to keep the holder 50 in a stationary position while resting on a level surface. As clearly shown, the holding surface 100 may be designed with features representative of a sport object. For example, the materials used to fashion a football are represented. Additionally, adhesive stickers, shrink wrap, paint, and/or outer skins may be applied to the holding surface 100, holder 50, and/or portions thereof, to add logos, information, and/or color.

Figure 26:
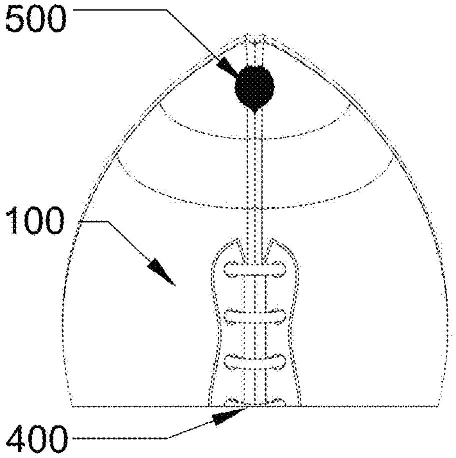
FIG. 26 illustrates a rear view representation of a holder—football edition.

FIG. 26 is a rear view representation of a holder 50 (football edition) with visible curvature of holding surface 100 and a hole 500 purposed for insertion of a Fine Point Sharpie Permanent Marker 1650 (shown in FIG. 18) when holder 50 is in use to obtain autographs. Equally, a pennant 1400 (shown in FIG. 17) may be inserted into hole 500 when the holder 50 is at rest. In this configuration, the holder 50 may hold a pennant 1400 (shown in FIG. 17) while displaying a trading card 1325 or image inserted into the signature card holder 900 (shown in FIG. 5), displayed on top of flat signing surface 300 and held in place by slot 200, while the holder 50 rests on a surface such as a shelf or desktop.

Figure 27:
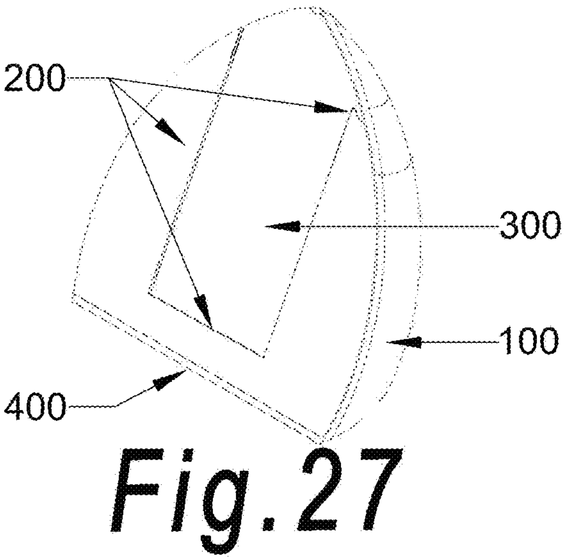
FIG. 27 illustrates a right front isometric representation of a holder—football edition.

FIG. 27 is a right front isometric representation of a holder 50 (football edition) with visible curvature of holding surface 100. Right front isometric representation of holder 50 shows a visible curvature of holding surface 100 and also shows a flat signing surface 300. The flat signing surface 300 is recessed relative to a facing 150 (shown in FIG. 25), with a plane aligned with the flat signing surface 300 being substantially parallel to a plane aligned with the facing 150. The facing 150 and flat signing surface 300 are arranged to create a three-sided slot 200 to hold a trading card 1325 (shown in FIG. 5) inserted into signature card holder 900 (shown in FIG. 5). The flat signing surface 300 provides a smooth area for a signature to be applied, for example, to a trading card 1325 (shown in FIG. 5). When in use as designed, the holder 50 is an effective tool for autograph collectors.

Figure 28:
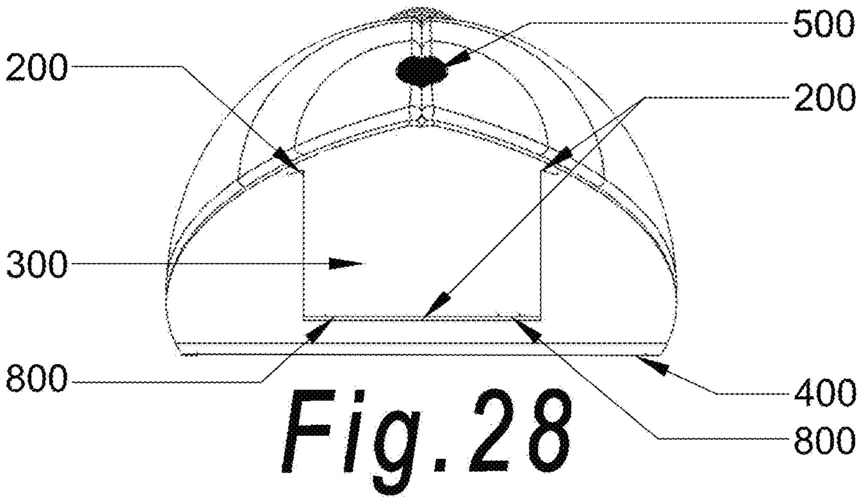
FIG. 28 illustrates an isometric top view representation of holder—football edition.

FIG. 28 is an isometric top view representation of holder 50 (football edition) with a flat signing surface 300. The flat signing surface 300 is recessed relative to a facing 150 (shown in FIG. 25), with a plane aligned with the flat signing surface 300 being substantially parallel to a plane aligned with the facing 150. The facing 150 and flat signing surface 300 are arranged to create a three-sided slot 200 to hold a trading card 1325 (shown in FIG. 5) inserted into signature card holder 900 (shown in FIG. 5). Pressure tabs 800 in combination with slot 200 provides a tight fit when holding a signature card holder 900 (shown in FIG. 5). The flat signing surface 300 provides a smooth area for a signature to be applied, for example, to a trading card 1325 (shown in FIG. 5). When in use as designed, the holder 50 is an effective tool for autograph collectors.

FIGS. 29-33 show various representations of a holder 50 (hockey edition), designed to represent a portion of a hockey puck. The labelled elements in FIGS. 29-33 share common numbering and likewise point out similar features with the figures previously described.

FIGS. 34-38 show various representations of a holder 50 (auto racing edition), designed to represent a portion of a racing car tire. The labelled elements in FIGS. 34-38 share common numbering and likewise point out similar features with the figures previously described.

FIGS. 39-43 show various representations of a holder 50 (soccer edition), designed to represent a portion of a soccer ball. The labelled elements in FIGS. 39-43 share common numbering and likewise point out similar features with the figures previously described.

FIGS. 44-48 show various representations of a holder 50 (golf edition), designed to represent a portion of a golf ball. The labelled elements in FIGS. 44-48 share common numbering and likewise point out similar features with the figures previously described.

FIGS. 49-53 show various representations of a holder 50 (tennis edition), designed to represent a portion of a tennis ball. The labelled elements in FIGS. 49-53 share common numbering and likewise point out similar features with the figures previously described.

FIGS. 54-57 show various representations of a holder 50 (mixed martial arts edition), designed to represent a portion of a mixed martial arts glove. The labelled elements in FIGS. 54-57 share common numbering and likewise point out similar features with the figures previously described.

FIGS. 58-61 show various representations of a holder 50 (boxing edition), designed to represent a portion of a boxing glove. The labelled elements in FIGS. 58-61 share common numbering and likewise point out similar features with the figures previously described.

Figure 64:
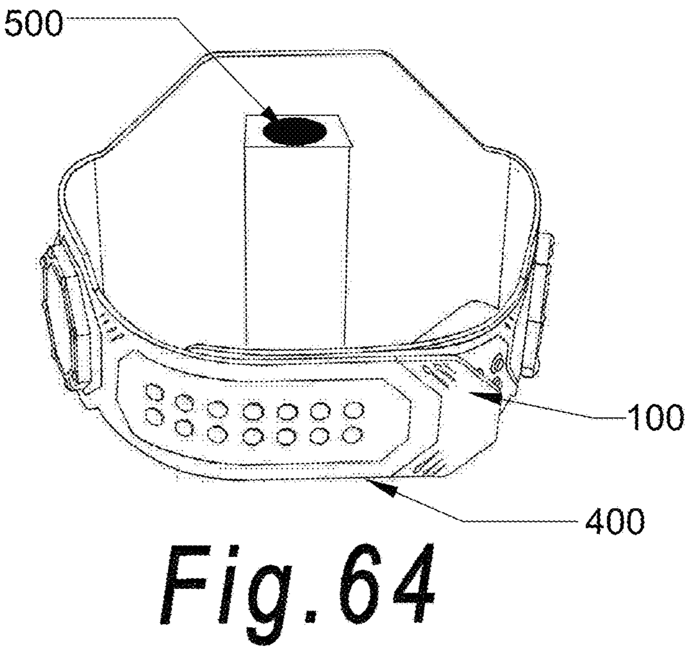
FIG. 64 illustrates a rear view representation of a holder—wrestling edition.
Figure 62:
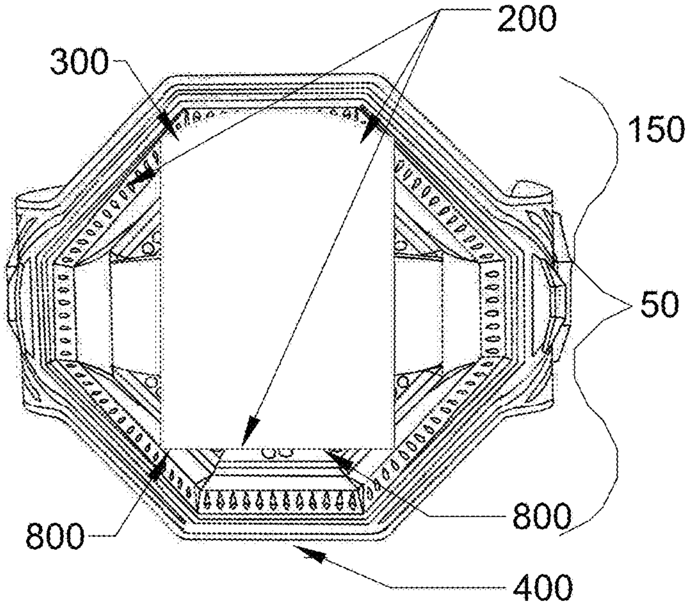
FIG. 62 illustrates a front view representation of a holder designed to represent a portion of a wrestling belt.
Figure 63:
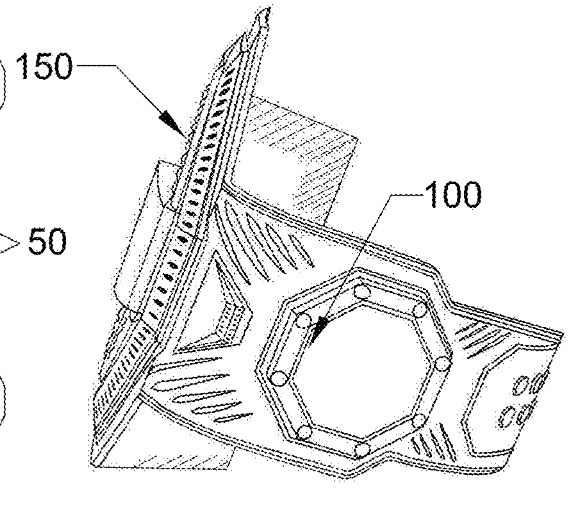
FIG. 63 illustrates a right view representation of a holder—wrestling edition.

FIGS. 62-64 show various representations of a holder 50 (wrestling edition), designed to represent a portion of a wrestling belt. The labelled elements in FIGS. 62-64 share common numbering and likewise point out similar features with the figures previously described.

Figure 67:
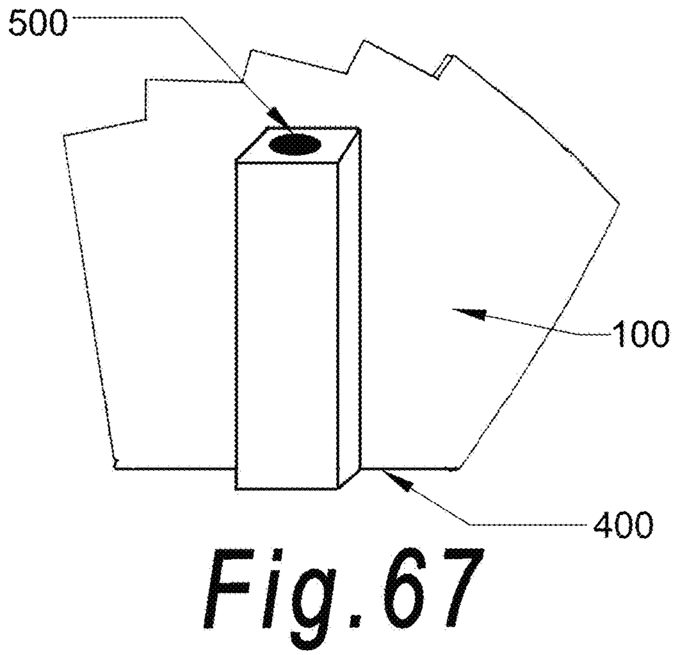
FIG. 67 illustrates a rear view representation of a holder—poker edition.
Figure 65:
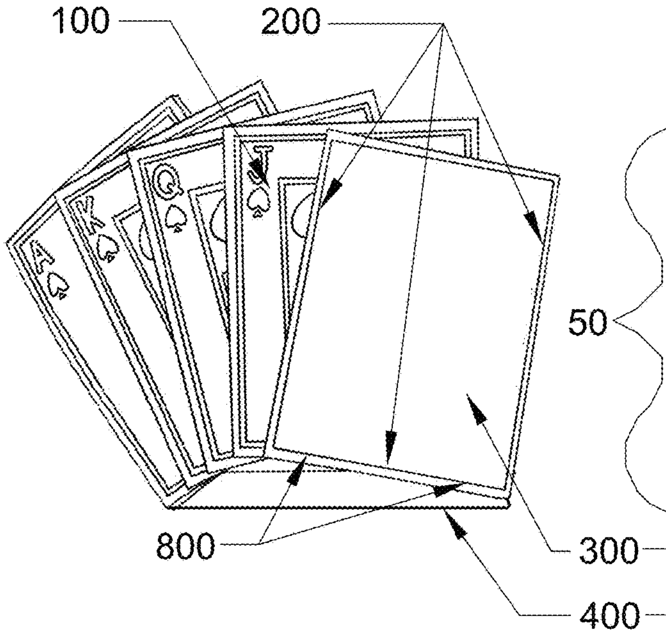
FIG. 65 illustrates a front view representation of a holder designed to represent a portion of a poker hand.
Figure 66:
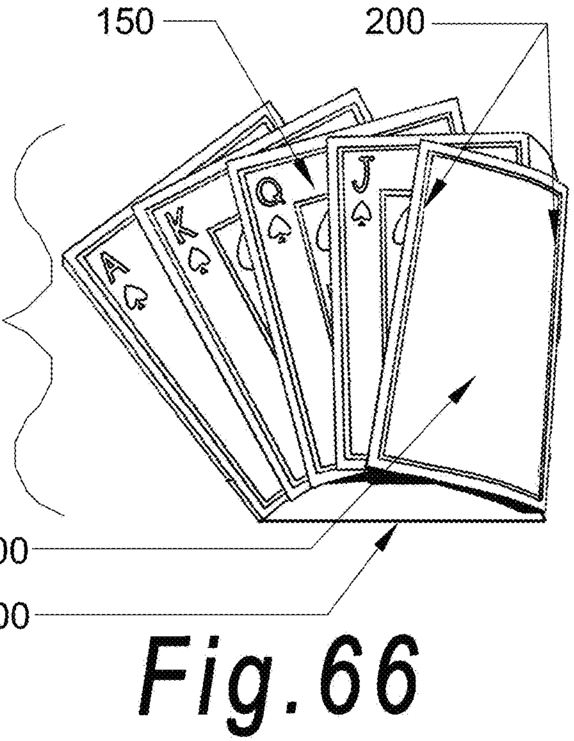
FIG. 66 illustrates a right view representation of a holder—poker edition.

FIGS. 65-67 show various representations of a holder 50 (poker edition), designed to represent a portion of a poker hand. The labelled elements in FIGS. 65-67 share common numbering and likewise point out similar features with the figures previously described.

FIGS. 1-4 note that the holder 50 may be preferably manufactured from polyethylene; however, a person of ordinary skill in the art would recognize that a large variety of suitable materials exist, including a wide variety of plastics. FIGS. 1-4 should not be considered to limit the manufacturing material(s). FIG. 5 notes the signature card holder 900 may be preferably manufactured from polypropylene sheet; however, a person of ordinary skill in the art would recognize that a large variety of suitable materials exist, including a wide variety of plastics. FIG. 5 should not be considered to limit the manufacturing material(s).

FIGS. 1-4, 6-16, and 19-57 show a variety of holders from various views, each shaped as at least a portion of a sports object. These holders may be manufactured using 3D printing technology, vacuum forming technology, blow molding technology, injection molding technology with or without additional injection molding steps to additively combine different materials and/or colors. Injection molding technology may require several pieces to be assembled into a single holder. These holders may also have adhesive stickers, shrink wrap, paint, and/or outer skins applied to the underlying structure to add logos, information, and/or color. A person of ordinary skill in the art would recognize that a large variety of manufacturing techniques are available, and the claimed invention should not be limited in its method of manufacture except by the attached claims.

Advantages of the present invention may include one or more of the following. In one or more embodiments, a holder 50 secures both a trading card 1325 and a writing instrument, for example, Fine Point Sharpie Permanent Marker 1650. As such, the trading card 1325 and writing instrument are readily available should an opportunity exist to obtain an autograph. Furthermore, if the trading card 1325 and writing instrument must be delivered from a distance, the holder 50 provides an apparatus to secure both the trading card 1325 and writing instrument during that delivery. Delivery may include tossing a holder 50 to become airborne. Also, the holder 50 provides an apparatus to support the trading card 1325 while affixing an autograph. The flat signing surface 300 and window (front) 1350 further enable collecting an autograph. The signature card holder 900 makes handling and changing a trading card 1325 easier when interacting with a holder 50, and also less prone to damage.

The holder 50 may be to be shaped to resembles at least a portion of a sports object that is used during play of a sport and that is expected to be transferred from a player to at least one of the player's teammate, an opponent, and an official governing play of the sport according to rules of a game.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus, comprising:

a holder shaped as at least a portion of a sports object comprising a bottom surface arranged to keep said holder in a stationary position while resting on a level surface, said holder further shaped with a facing comprising a flat signing surface recessed into said facing, wherein said flat signing surface is arranged to allow a rectangular trading card to be inserted in an opening perpendicular with said facing, at least a portion of said opening is level with said flat signing surface, wherein said holder comprises a stepped cylindrical shaft arranged to retain a removable object, wherein a lip overlaps said flat signing surface on three sides, wherein said lip has an overlap of said flat signing surface between 1 mm and 5 mm, inclusively, and wherein a distance between said flat signing surface and said lip is between 1 mm and 5 mm, inclusively.

2. The apparatus of claim 1, wherein a shape of said holder resembles said at least said portion of said sports object that is used during play of a sport and that is expected to be transferred from a player to at least one of said player's teammate, an opponent, and an official governing said play according to rules of a game.

3. The apparatus of claim 1, further comprising a pennant as said removable object, wherein said pennant includes a stick with a stepped end.

4. The apparatus of claim 3, wherein said pennant is marked with at least one of a team name, team logo, team mascot, and year.

5. The apparatus of claim 1, further comprising a writing instrument as said removable object.

6. The apparatus of claim 5, wherein said writing instrument is at least one of a permanent marker, a felt tip pen, a ball point pen, and a pencil.

7. The apparatus of claim 1, wherein said stepped cylindrical shaft is arranged to provide a substantially air tight enclosure with at least a portion of a writing instrument, said stepped cylindrical shaft arranged to operate as a cap for said writing instrument.

8. The apparatus of claim 7, wherein said writing instrument is at least one of a permanent marker, a felt tip pen, and a ball point pen.

9. The apparatus of claim 1, wherein said stepped cylindrical shaft comprises at least three sections, each section of said at least three sections with a different diameter than other sections of said at least three sections.

10. The apparatus of claim 1, further comprising at least one of an outer skin, paint, an adhesive sticker, and a wrap providing a colored representation of a sport.

11. The apparatus of claim 1, wherein said holder is between 80 mm and 200 mm, inclusively, in height, and between 80 mm and 200 mm, inclusively, in width.

12. The apparatus of claim 1, wherein said facing is angled either perpendicular or of an acute angle relative to said bottom surface, said acute angle between 89 and 45 degrees, inclusively.

13. The apparatus of claim 1, further comprising a signature card holder arranged to enclose said rectangular trading card, said signature card holder having a window that exposes said rectangular trading card to allow a signature to be affixed to said rectangular trading card, said signature card holder shaped to be fully inserted into said opening and retained by a lip overlapping said flat signing surface on three sides.

14. The apparatus of claim 13, wherein said signature card holder is manufactured from plastic sheeting of at least 5 mil in thickness.

15. The apparatus of claim 1, further comprising at least one pressure tab to retain a signature card holder when said signature card holder is fully inserted into said opening.

16. The apparatus of claim 1, wherein said sports object pertaining to a sport including at least one of baseball, basketball, football, hockey, auto racing, soccer, golf, tennis, mixed martial arts, boxing, professional wrestling, and poker.

17. A method of manufacture, comprising:

forming one or more shapes to be assembled into a holder shaped as at least a portion of a sports object comprising a bottom surface arranged to keep said holder in a stationary position while resting on a level surface, said holder further shaped with a facing comprising a flat signing surface recessed into said facing, wherein said flat signing surface is arranged to allow a rectangular trading card to be inserted in an opening perpendicular with said facing, at least a portion of said opening is level with said flat signing surface, wherein said holder comprises a stepped cylindrical shaft arranged to retain a removable object, wherein a lip overlaps said flat signing surface on three sides, wherein said lip has an overlap of said flat signing surface between 1 mm and 5 mm, inclusively, and wherein a distance between said flat signing surface and said lip is between 1 mm and 5 mm, inclusively.

18. The method of manufacture of claim 17, further comprising:

applying at least one of an outer skin, paint, an adhesive sticker, and a wrap providing a colored representation of a sport.

19. An apparatus, comprising:

a holder shaped as at least a portion of a sports object comprising a bottom surface arranged to keep said holder in a stationary position while resting on a level surface, said holder further shaped with a facing comprising a flat signing surface recessed into said facing, wherein a lip overlaps said flat signing surface on three sides, wherein said flat signing surface is arranged to allow a trading card to be inserted in an opening, wherein said holder comprises a stepped cylindrical shaft arranged to retain a removable object, wherein said stepped cylindrical shaft comprises at least three sections, each section of said at least three sections with a different diameter than other sections of said at least three sections; and a signature card holder arranged to enclose said trading card, said signature card holder having a window that exposes said trading card to allow a signature to be affixed to said trading card, said signature card holder shaped to be fully inserted into said opening and retained by said lip overlapping said flat signing surface on three sides.

* * * * *